United States Patent
Miguel

[15] 3,690,473
[45] Sept. 12, 1972

[54] BALE HANDLING DEVICE

[72] Inventor: Marvin E. Miguel, 12691 S. 10th, Hanford, Calif. 93230

[22] Filed: June 16, 1969

[21] Appl. No.: 843,890

Related U.S. Application Data

[63] Continuation-in-part of Ser. No. 717,533, April 1, 1968, abandoned.

[52] U.S. Cl. .................214/6 B, 214/6 G, 214/6 P
[51] Int. Cl. .....................B65g 57/24, B65g 57/32
[58] Field of Search.............214/6 B, 6 G, 6 K, 6 P

[56] References Cited

UNITED STATES PATENTS

| | | | |
|---|---|---|---|
| 3,443,699 | 5/1969 | Lundahl | 214/6 B |
| 3,515,292 | 6/1970 | Oborny | 214/6 B |
| 2,977,002 | 3/1961 | Asp | 214/6 P |
| 3,278,055 | 10/1966 | Stoltz | 214/6 B UX |
| 3,385,456 | 5/1968 | Snider | 214/6 B |
| 3,395,814 | 8/1968 | Grey | 214/6 B |
| 3,400,839 | 9/1968 | Jay et al. | 214/6 B |
| 3,401,810 | 9/1968 | Grey | 214/6 B |
| 3,443,699 | 5/1969 | Lundahl | 214/6 B |
| 3,446,369 | 5/1969 | May et al. | 214/2 B |
| 3,446,370 | 5/1969 | Clendenin et al. | 214/6 B |

*Primary Examiner*—Robert J. Spar
*Attorney*—Vergil L. Gerard

[57] ABSTRACT

This invention is a mobile, self-propelled machine for picking up bales in the field, and stacking them, and loading them for transport or storage. The stacking of bales for highway transport requires that alternate tiers be formed with the bales placed in different positions with respect to the bales in the adjacent tier, so that ties are formed between the tiers to hold the stack together. A tie is formed by placing the outside bales of one tier in such a position that they overlap the division between two bales of an adjacent tier. My bale stacker and loader picks up the bales from the field, arranges them in seven tiers of eight bales each with the bales in alternate tiers positioned to form the necessary ties to form a transportable 56 bale stack. In addition, my bale stacker and loader is capable of unloading the 56 bale stack onto the ground, a truck bed, or into position in a larger storage stack, and of loading and transporting such a stack of bales.

17 Claims, 20 Drawing Figures

MARVIN E. MIGUEL
INVENTOR

MARVIN E. MIGUEL
INVENTOR

MARVIN E. MIGUEL
INVENTOR

Vergil L. Gerard
ATTORNEY

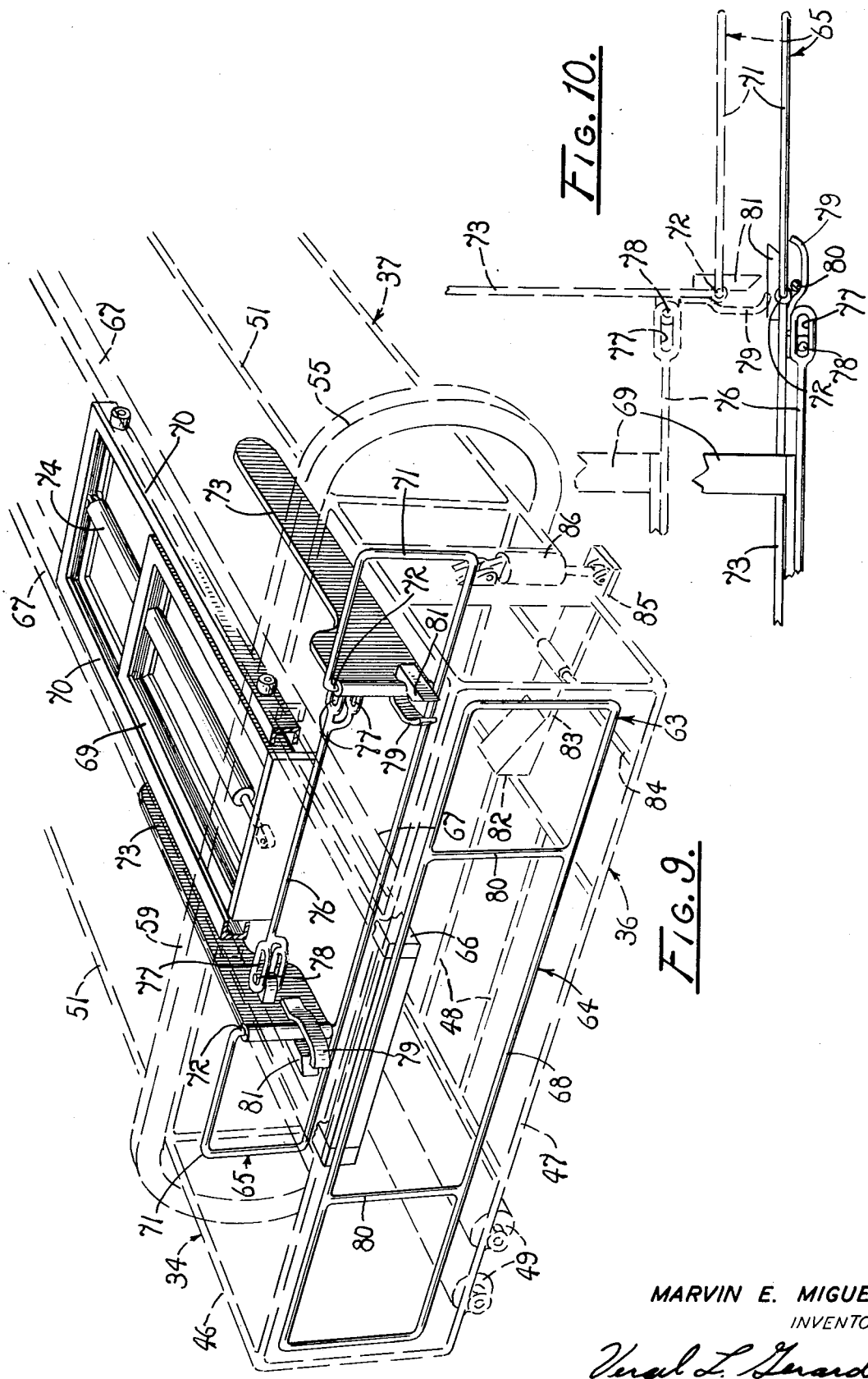

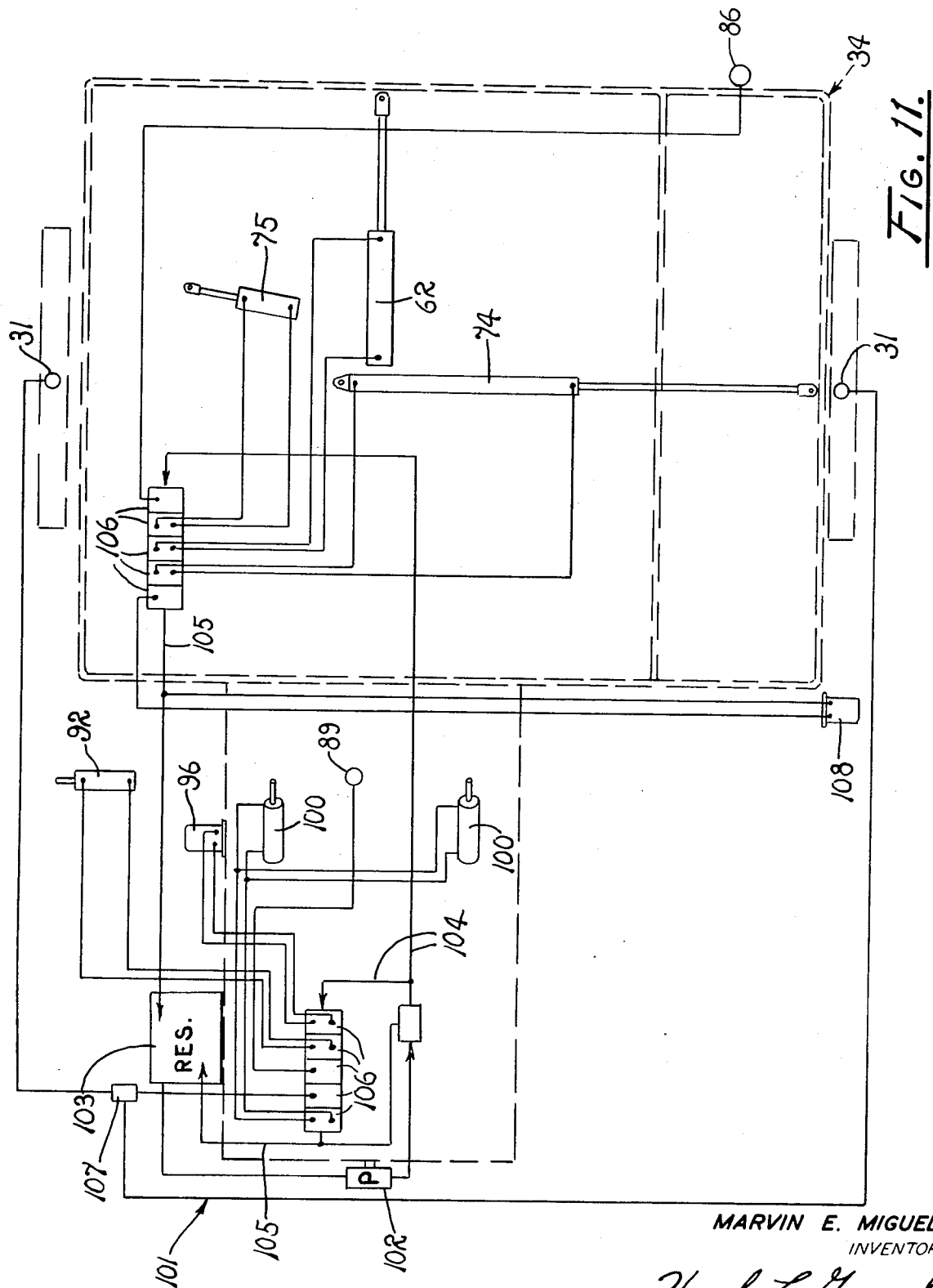

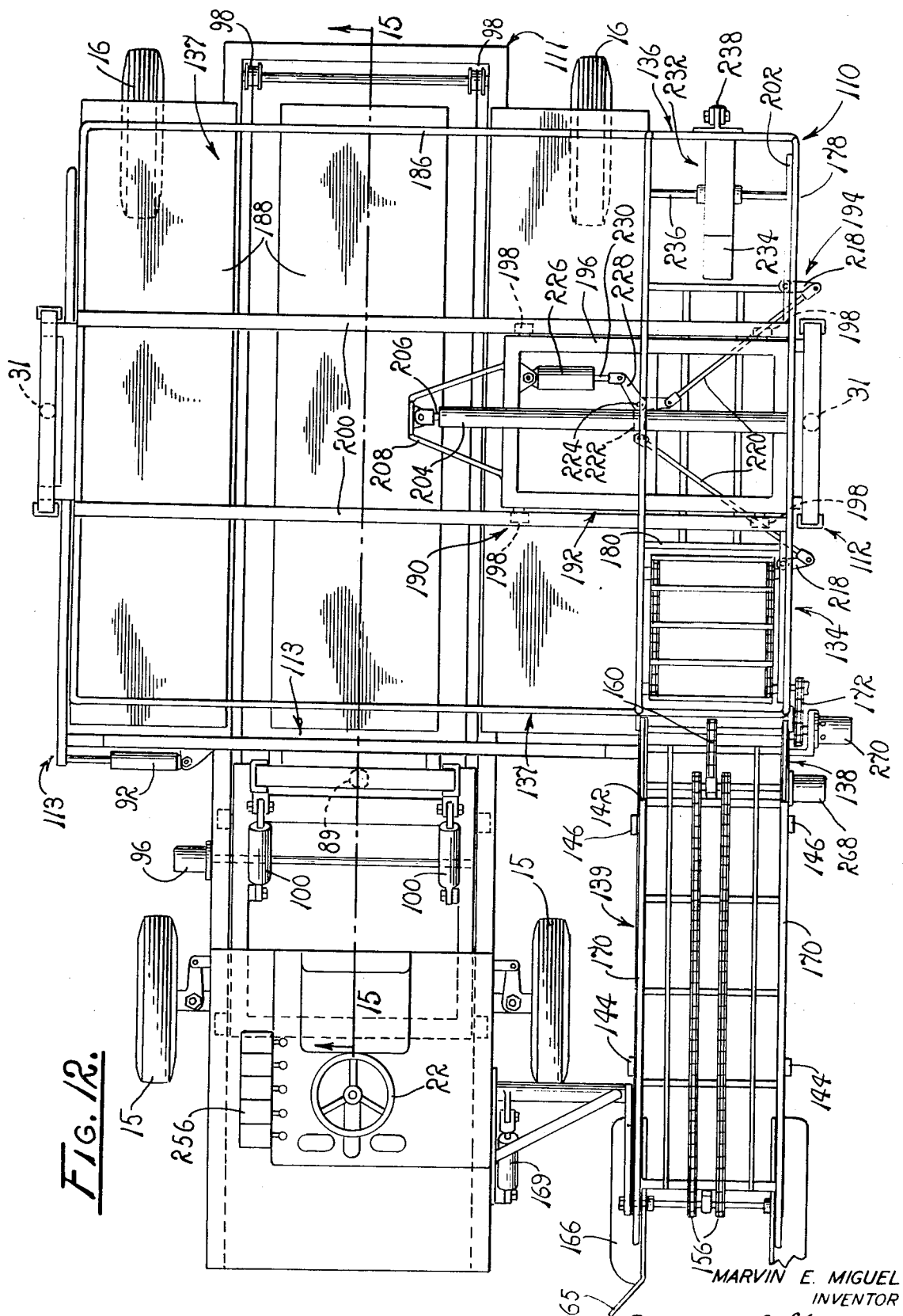

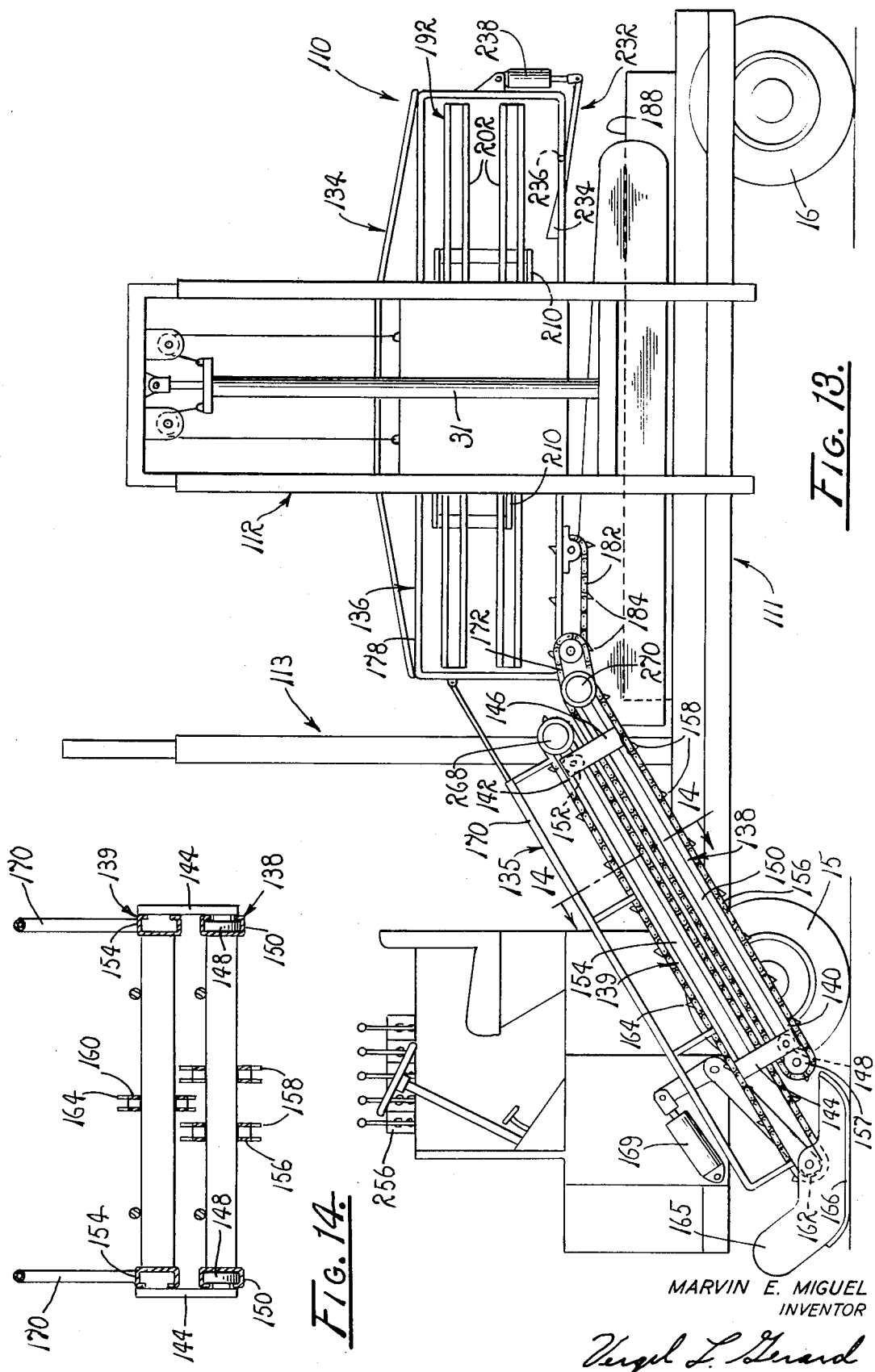

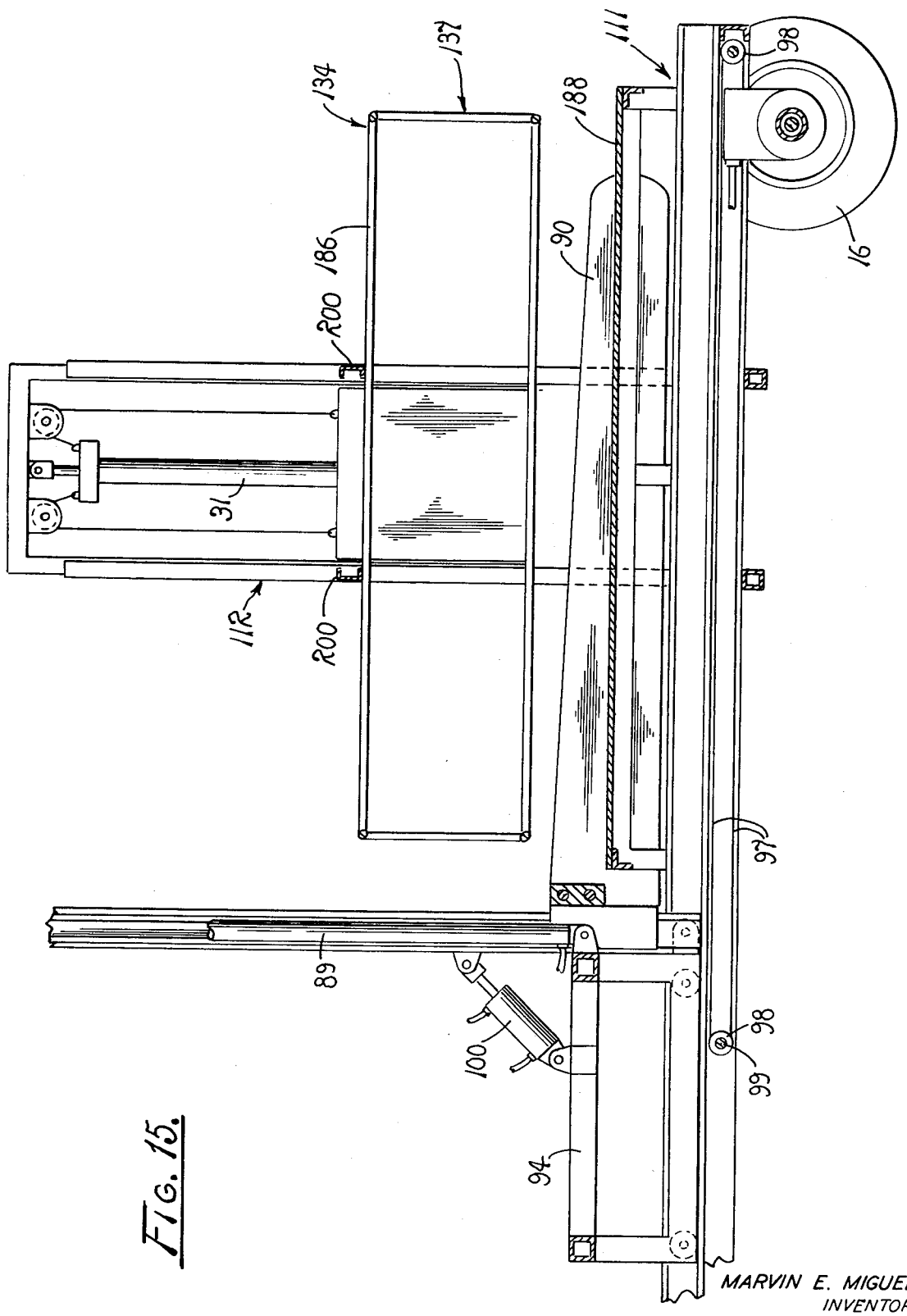

MARVIN E. MIGUEL
INVENTOR

MARVIN E. MIGUEL
INVENTOR

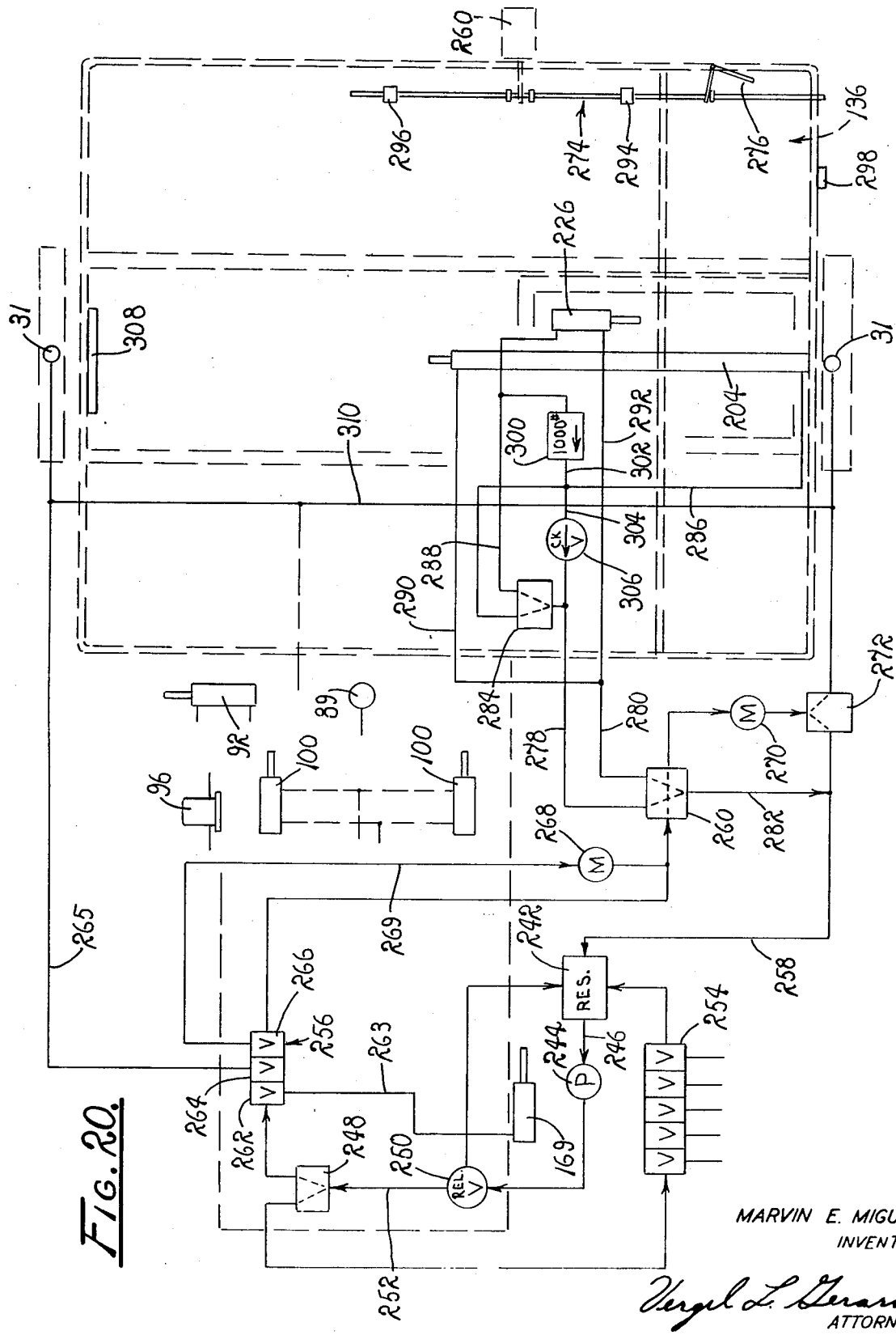

BALE HANDLING DEVICE

This application is a continuation-in-part of application, Ser. No. 717,533 filed by applicant on Apr. 1, 1968 and entitled BALE HANDLING DEVICE, now abandoned.

This invention relates generally to bale handling devices and more particularly to devices for picking up bales from the field, stacking them, and unloading and re-loading them for transport or storage.

In response to the increasing interest of agriculture in labor saving devices, various machines have been developed to eliminate the hand labor of picking up bales left in the fields by a harvester and loading them onto a truck or other transport means for transportation to a place of storage or use. Devices have also been developed for handling stacks of bales to eliminate the hand labor involved in loading stacks of bales to eliminate the hand labor involved in loading and unloading each stacks from a transport means, placing them in larger stacks for storage, and delivering them to a point of use.

Machines of these types have gained considerable use because of the convenience and economy which they provide; however, the devices presently known are less versatile than desired, and are quite expensive because of the number of devices required to do a complete handling job. Also, the devices presently known still require hand labor where ties are required in the bale stack.

According to the legal restrictions in most states applicable to the highway transport of stacked bales, the load must be made up of unit stacks of eight bales in a tier, seven tiers high, making a total of 56 bales per unit. Although the bales in the bottom tier and next to bottom tier of the 56 bale unit may be placed in the same relationship, the bales in the third tier from the bottom and in each alternate tier must be positioned to form ties. These ties are formed by positioning the bales which form the periphery of the tier so that they overlap the junction of two peripheral bales in the stack below. The peripheral bales in the tie tier thus bridge the junction between the peripheral bales of the adjacent tier and tie the stack of bales together. The inserting of ties in the 56 bale unit makes the unit considerably easier to handle and is, therefore, desirable even though the bales are not to be transported on the highway. It is the inserting of these ties in alternate tiers of the 56 bale unit stack which still requires hand labor in the presently existing devices.

Also, none of the presently existing devices are capable of both forming the 56 bale unit stack and loading this stack onto a truck bed, or into a desired position in a larger stack for reloading onto a truck, or for delivery to a point of use. At present, the stacking is done by one piece of equipment and the loading, unloading and delivery to a point of use is done by another.

It is, therefore, a major object of my invention to provide a bale handling device capable of stacking bales, loading and unloading them, and transporting them for limited distances.

It is also an object of my invention to provide a bale handling device of the type described which is capable of automatically positioning bales during stacking to form ties in alternate tiers for easier handling.

It is a further object of my invention to provide a bale handling device of the type described which requires only a single operator for the performance of all of its functions.

It is another object of my invention to provide a bale handling device of the type described which is mobile and self-propelled.

It is still a further object of my invention to provide a bale handling device of the type described in which the stacking mechanism may be removed when the device is to be used only for loading, unloading and short distance transport.

It is still another object of my invention to provide a bale handling device of the type described which is less expensive to construct, faster in operation, and simpler to maintain than devices heretofore known.

These and other objects and advantages of my invention will become more readily apparent from the following detailed description of a preferred embodiment and the accompanying drawings in which:

FIG. 9 is a partial perspective view of the transverse pusher and turner mechanism shown in FIGS. 6 and 7;

FIG. 10 is a fragmentary view of the turner mechanism linkage shown in FIG. 9;

FIG. 11 is a schematic view of the hydraulic system used in my first embodiment;

FIG. 12 is a plan view of a second preferred embodiment of my invention;

FIG. 13 is a side elevational view of my second embodiment;

FIG. 14 is a partial sectional view taken on line 14—14 in FIG. 13;

FIG. 15 is a partial sectional view in elevation taken on line 15—15 in FIG. 12;

FIG. 20 is a schematic view of the power and control system used in my second embodiment.

Figure 1:
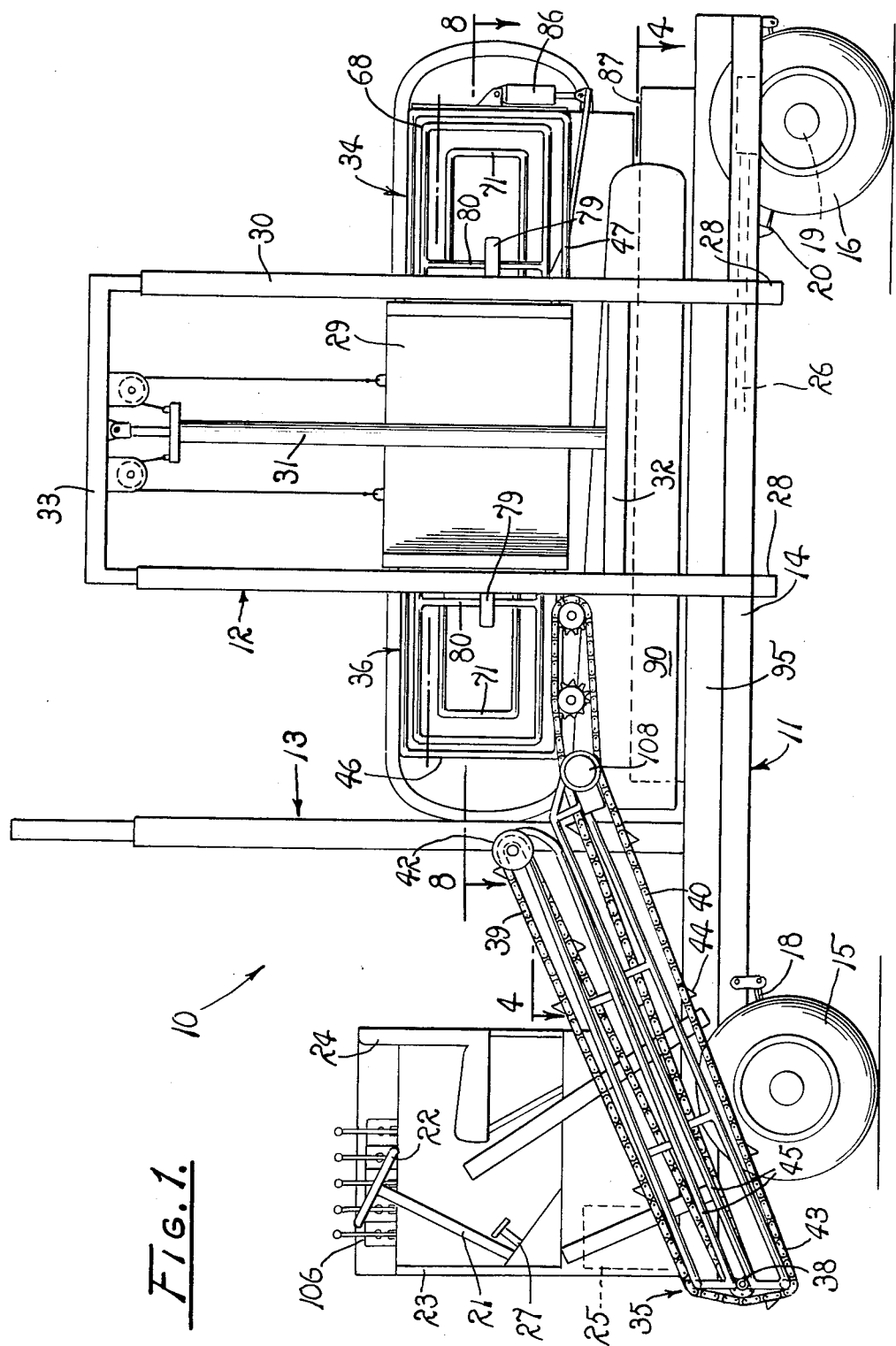
FIG. 1 is a side elevational view of a first preferred embodiment of my invention.
Figure 2:
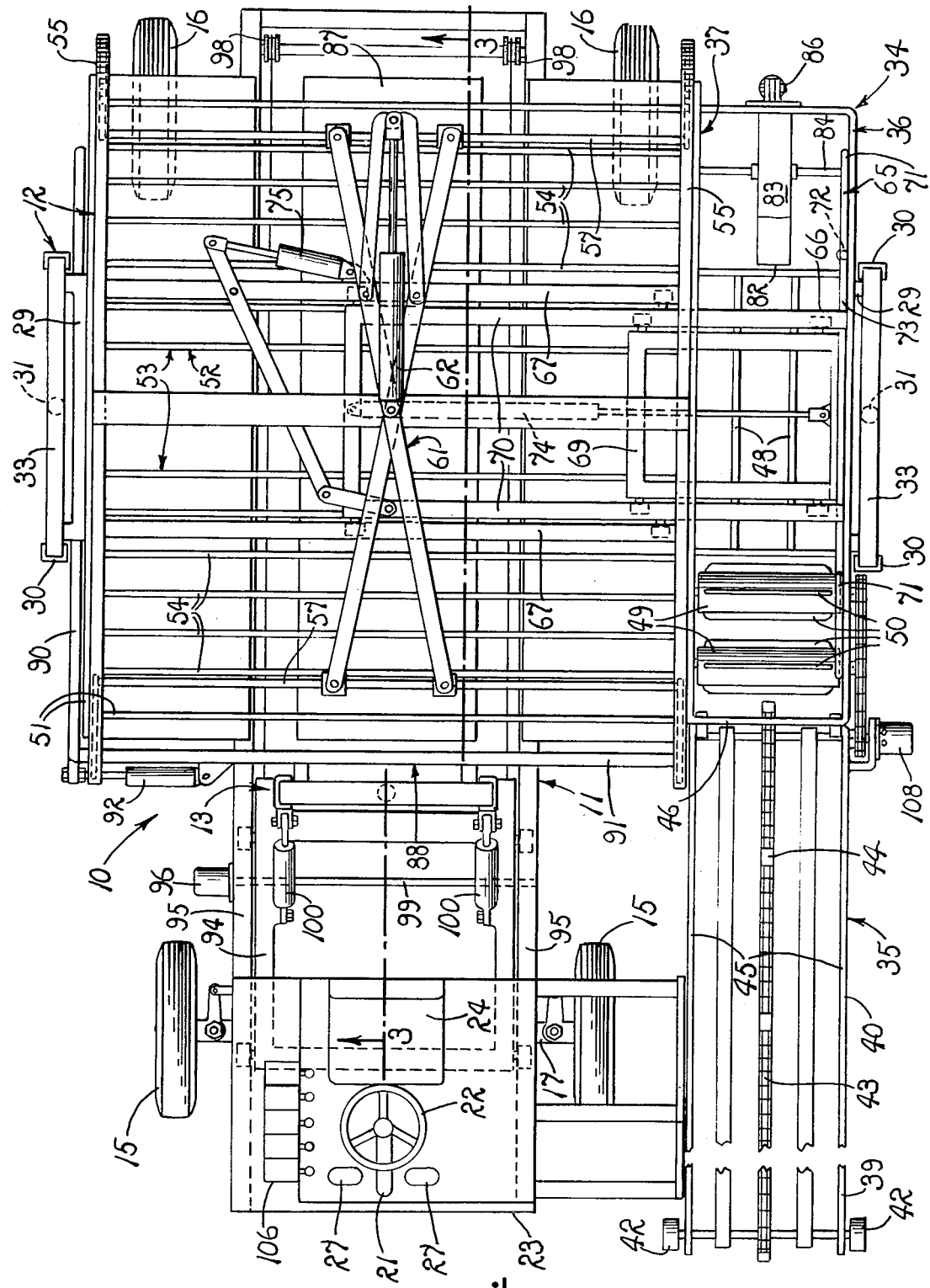
FIG. 2 is a plan view of the embodiment shown in FIG. 1.
Figure 3:
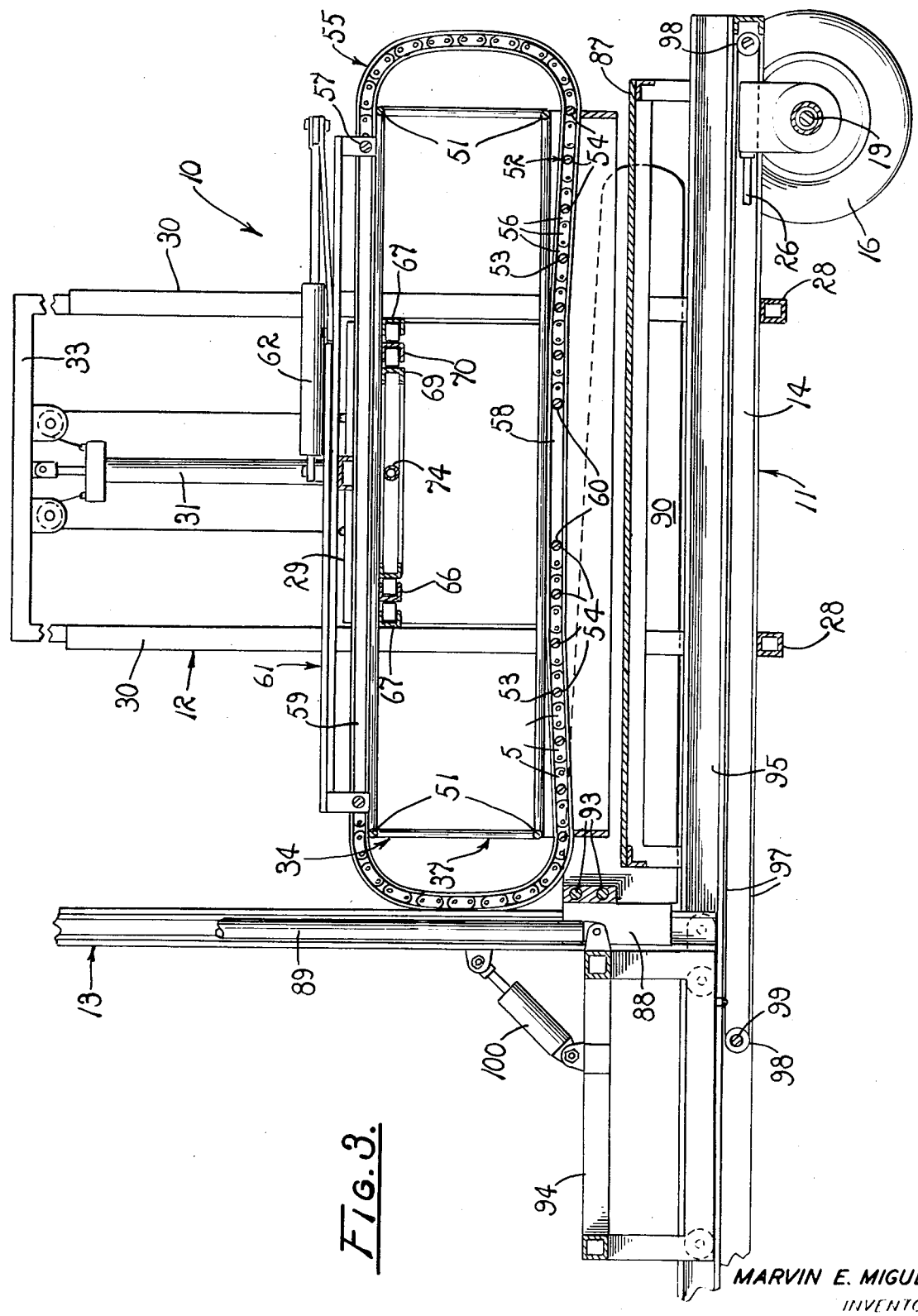
FIG. 3 is a partial, cross-sectional side elevational view taken on line 3—3 in FIG. 2.
Figure 4:
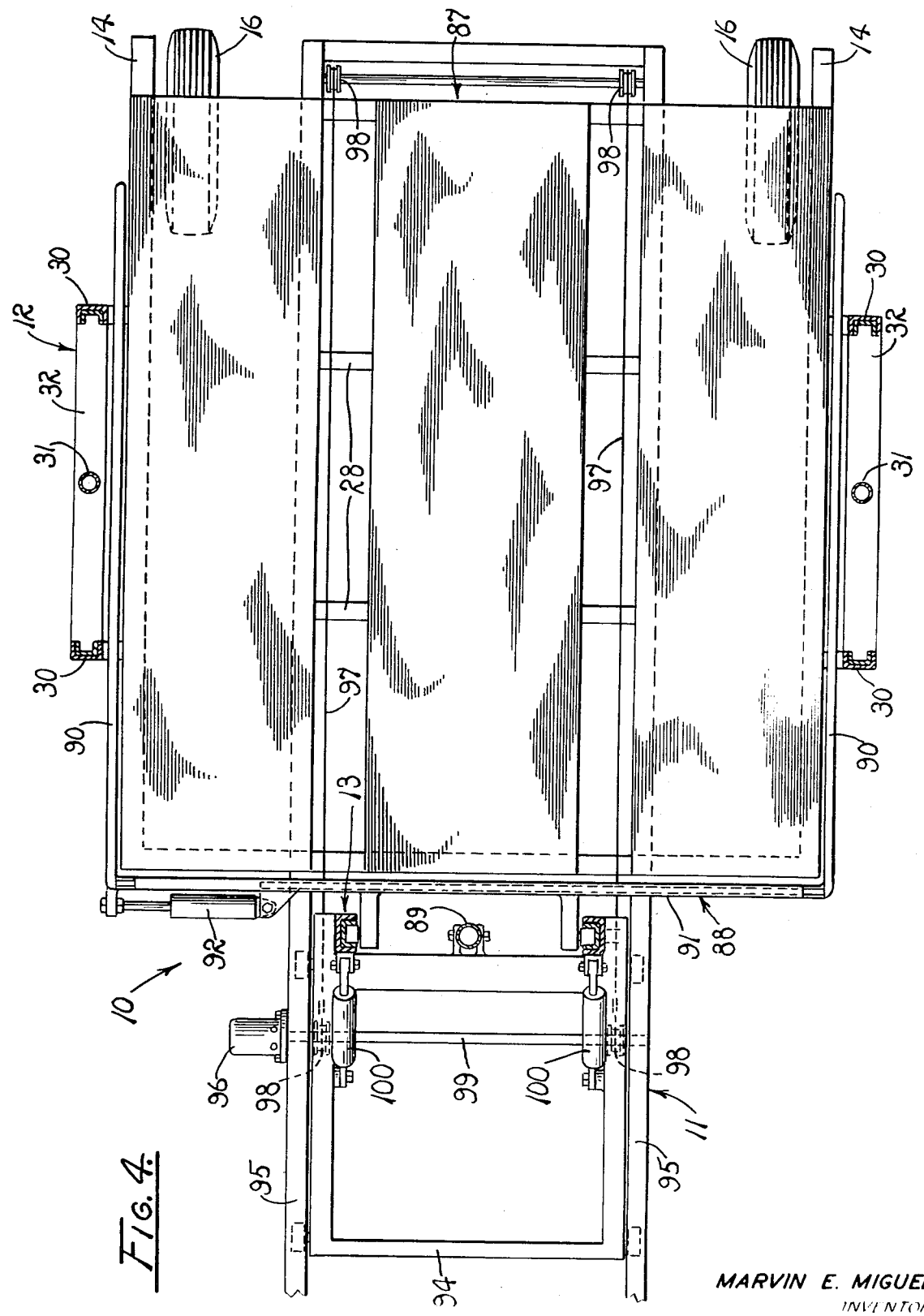
FIG. 4 is a cross-sectional plan view taken on line 4—4 in FIG. 1.

Referring now to the drawings, and particularly FIGS. 1 and 2 thereof, the numeral 10 designates generally a first preferred embodiment of my bale handling device which has a mobile, self-propelled chassis 11, a stacking mechanism 12 and a loading mechanism 13.

CHASSIS

The chassis 11 consists of an elongated longitudinal frame 14 which is mounted on a set of front wheels 15 and a set of rear wheels 16. The front wheels 15 are connected by a transverse axle 17 which is attached to the forward end of the frame 14 by means of leaf springs 18. The rear wheels 16 are also connected by a transverse axle 19 which is attached to the frame by means of leaf springs 20. The front wheels 15 are mounted to the axle 17 for tandem turning by means of a steering mechanism 21 operated by a steering wheel 22 located in an operator's cab 23, all in a manner well known in the art. The operator's cab 23 sets on the frame 14 just above the front wheels 15 and has a seat 24 for the operator. A power unit 25 is mounted beneath the operator's cab 23, which both propels the chassis 11 and powers the stacking mechanism 12 and the loading mechanism 13. The power unit 25 is connected to the rear wheels 16 by a drivehaft 26, and controls 27 are provided in the operator's cab 23 for operating the power unit 25 and the hydraulic system later described.

The chassis 11 also has a transverse support frame 28 which supports the stacking mechanism 12, and is disposed transversely of the longitudinal frame 14 and extends from each side of the frame 14 on the rearward portion just behind the operator's cab 23.

STACKER

The stacking mechanism is mounted on the transverse support frame 28 by means of a pair of vertically disposed lift frames 29. Each of the lift frames 29 are generally rectangular and have a pair of telescopic upstanding stanchions 30 that are retractible by means of a hydraulic lift frame actuating cylinder 31. The stanchions 30 are braced by a lower cross member 32 disposed between the outside member of the telescopic stanchions, and an upper cross member 33 disposed between the inside members. The hydraulic lift frame actuating cylinders 31 are interconnected between these cross members 32 and 33. With this arrangement, extension or retraction of the lift frame actuating cylinders 31 causes telescopic extension or retraction of the stanchions 30 in a manner well known in the art.

A bale handling carriage 34 is mounted between the lift frames 30 and is carried up and down in respect to the transverse support frame 28 by actuation of the lift frame actuating cylinders 31. The bale handling carriage 34 consists of a bale lift 35, a bale receiver 36, and tier support 37.

The bale lift 35 is connected to the forward end of the bale receiver 36 of bale handling carriage 34 and extends downwardly therefrom to the ground to convey bales from the field to the bale receiver. The bale lift has a hinged joint 38 intermediate its ends which permits its lower portion 39 to be folded over its upper portion 40 for storage when bales are not being lifted. When bales are to be lifted by the bale lift 35, it is extended to its full length with the lower portion 39 joined in alignment with the upper portion 40 and locked at the hinge joint 38.

When the bale lift is extended, the lower portion 39 is carried by a set of ground wheels 42 at a close distance above the ground. A chain conveyor 43 is provided in the bale lift with teeth 44 which engage the bales and carry them up the lift to the bale receiver 36. The bale lift 35 also has side rails 45 which prevent bales from sliding off as they are carried up the lift to the bale receiver 36 by the chain conveyor 43.

The upper portion 40 of the bale lift is pivotally connected to the forward end 46 of the bale receiver 36 so that when the bale handling carriage 34 is raised or lowered by the lift frames 29 the bale lift will adjust its slope to maintain contact of the wheels 42 with the ground.

The bale receiver 36 has an elongated frame housing 47, generally rectangular in cross section, which is disposed parallel to but outwardly of the longitudinal frame 14. The bale receiver 36 has a support floor 48 of sufficient length to contain two bales in abutted end to end alignment which is disposed to receive bales from the bale lift 35.

To transfer bales from the upper portion 40 of the bale lift 35 into the bale receiver 36, two rollers 49 with bale engaging paddles 50 projecting from their peripheries are rotatably mounted in the forward end 46 of the bale receiver. These rollers 49 engage bales delivered to the bale receiver by the bale lift and drive the bales longitudinally along the support floor 48 toward the rear of the bale receiver. After a first bale has been lifted from the ground by the bale lift 35 and deposited in the bale receiver 36, the next bale deposited in the bale receiver is forced into abutting end to end alignment with the first bale by the roller 49 driving the first bale further to the rear of the bale receiver.

The tier support 37 of the bale handling carriage 34 is disposed transversely inboard of the bale receiver 36 and has a rectangular frame 51 of sufficient size to contain a tier of eight bales, which is formed integrally with the frame housing 47 of the bale receiver and has the same length and height. The tier support 37 has a retractable floor 52 made up of two movable doors 53, each having a plurality of parallel support rods 54 disposed in spaced relationship in a pair of door tracks 55. The ends of the support rods 54 in each of the doors 53 are bearing mounted in the door tracks 55 and interconnected by links 56 to form integral structures. The links 56 also form a connecting chain to linkage, connecting rods 57 which attach to linkage for opening the doors as later explained more fully. The door tracks 55 follow a generally elliptical path from a lower portion 58 which runs substantially horizontal along the lower portion of the tier support frame 51 but curves upwardly at the front and rear of the frame and doubles back over the top to form an upper portion 59. The doors 53 are normally disposed in the lower portion of the door tracks 55 with their lead edges 60 spaced apart a distance less than the width of a bale. In this position they form the floor 52 for supporting bales disposed in the tier support 37. They are movable, however, to a stowed position in the upper portion of door tracks 55 which carries the lead edges 60 apart to a point outside the frame 51 and completely retracts the floor 52 leaving the tier support without a bottom.

When the doors 53 are disposed in their normal position the floor 52 which they form is sufficient to support a tier of eight bales within the tier support, and when they are moved to their stowed position they provide an opening in the bottom of the tier support through which a tier of eight bales may pass (see FIG.

3). The lower portion 58 of the door tracks 55, though generally horizontal, actually have a slight downward incline as they progress toward the edge of the frame 51. This incline causes bales disposed on the floor 52 to slide to the side of the frame 51, the advantages of which will become apparent later in this disclosure.

To operate the doors 53 of the tier support, a linkage mechanism 61 is provided in the upper portion of frame 51 which is connected to linkage connecting rods 57 on the doors. The linkage mechanism 61 is driven by a hydraulic linkage cylinder 62 which when extended drives the doors to their normal position, in the lower portion 58 of tracks 55 where they form floor 52, and when retracted drives the doors to their stowed position in the upper portion 59 of tracks 55.

To transfer bales from the bale receiver 36 to the tier support 37, a transverse pusher mechanism 63 is provided which consists of a main pusher 64 and an auxiliary pusher 65. The main pusher 64 has a main carriage 66 which is movably mounted in main carriage tracks 67 in the upper portion of the bale receiver frame housing 47 and the tier support frame 51. The tracks 67 are disposed transversely with respect to the longitudinal frame 14 and permit the carriage to travel crossways of the chassis 11. On the outermost portion of the main carriage 66, frame 68 is mounted to project downwardly into the bale receiver and tier support. The main push frame 68 is sufficiently small to pass through the bale receiver and the tier support without interference from the frame housing 47 or frame 51, and is disposed to engage bales in the bale receiver and slide them transversely onto the tier support floor 52 when main carriage 66 travels inboard from the bale receiver into the tier support 37 on the tracks 67. The distance of travel of the main carriage 66 in the tracks 67 is sufficient to permit the main push frame 68 to carry the bales in the bale receiver far enough into the tier support 37 to clear the bale receiver.

Figure 6:
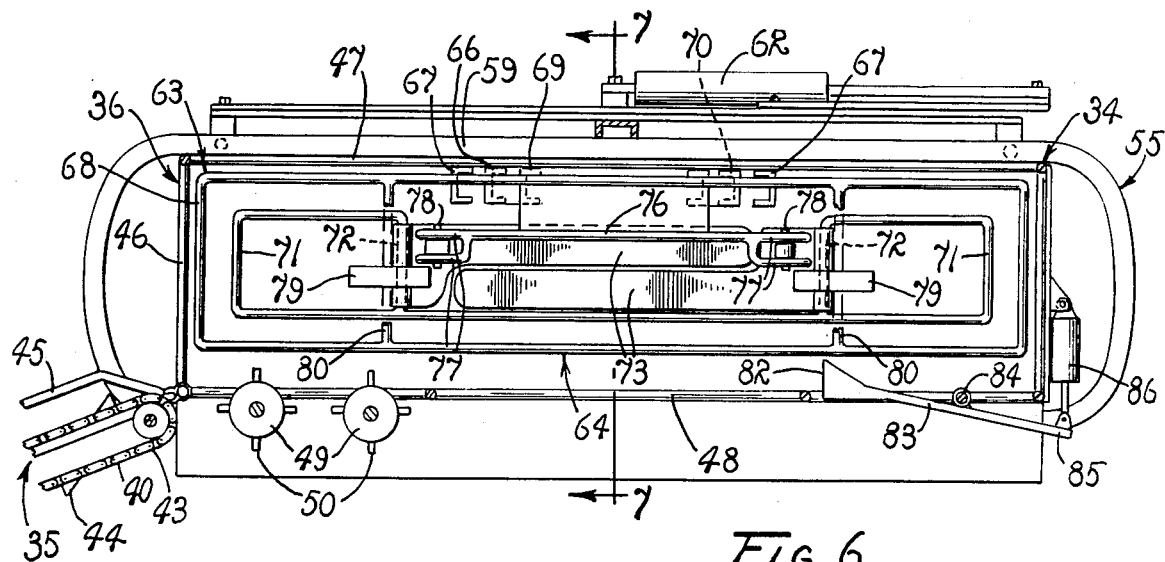
FIG. 6 is a partial side elevational view showing the bale receiver and the transverse pusher and turner mechanism of my first embodiment.
Figure 7:
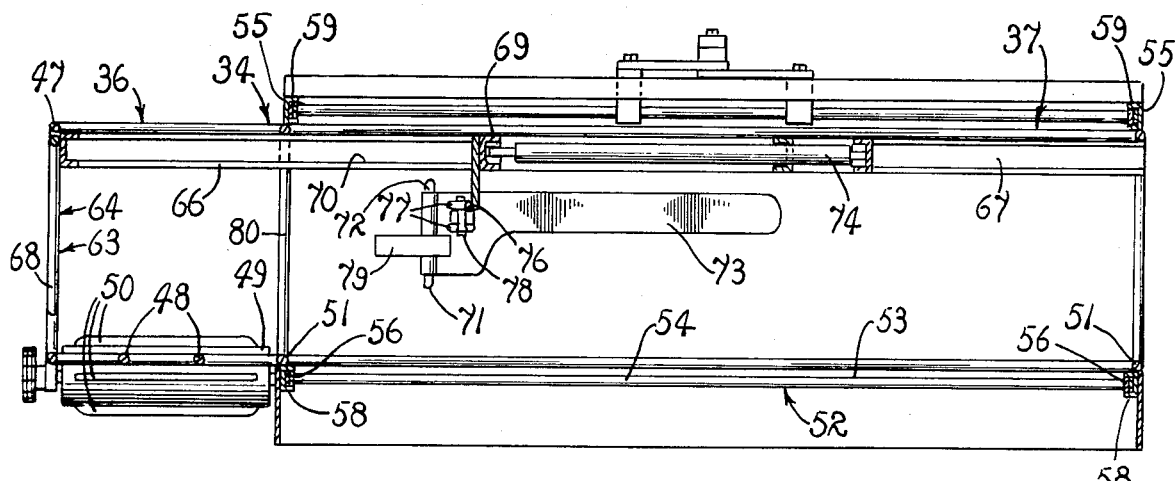
FIG. 7 is a partial rear elevational view taken on line 7—7 in FIG. 6; with some of the parts in a position to turn a bale.
Figure 8:
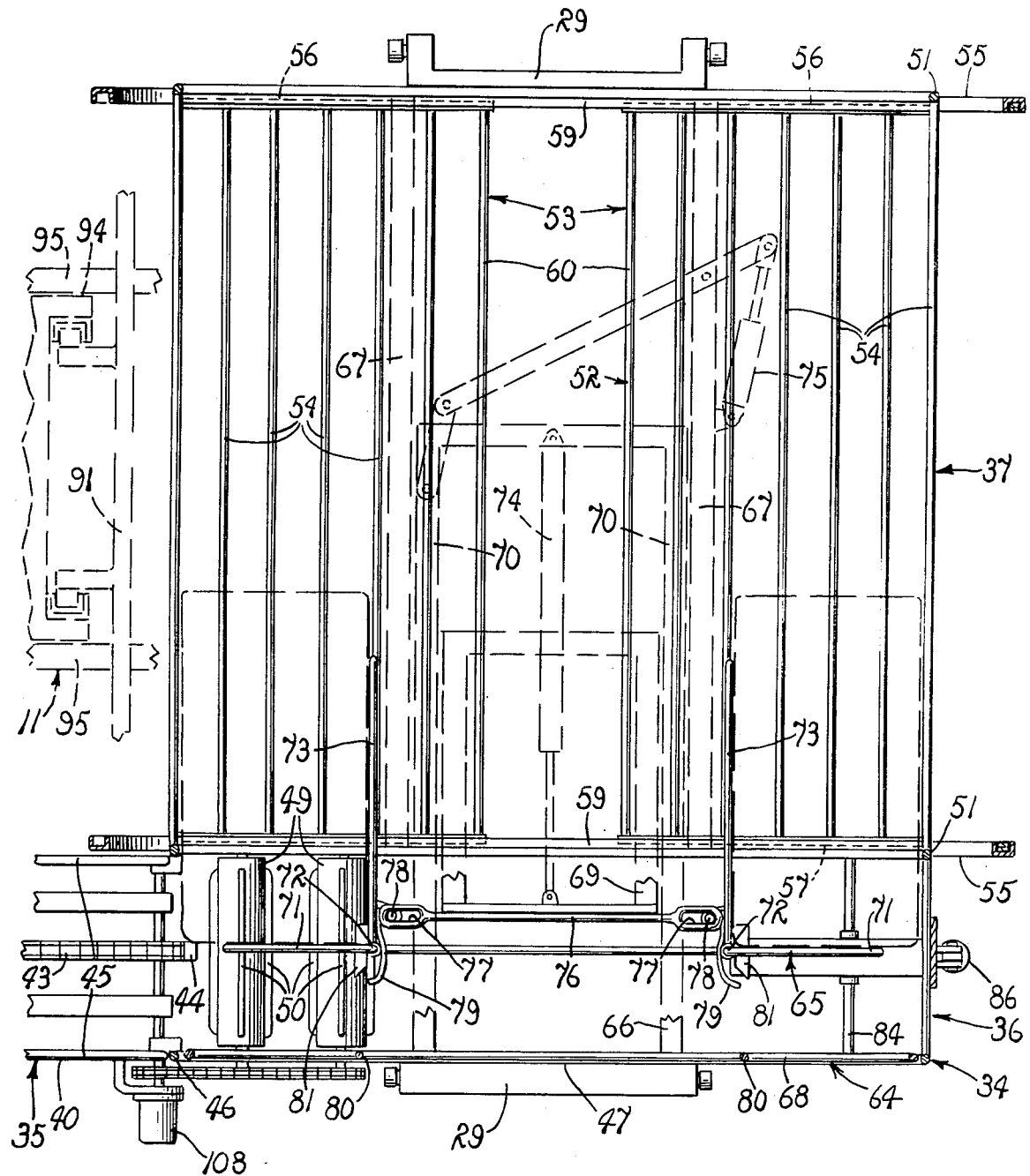
FIG. 8 is a partial cross-sectional plan view taken on line 8—8 in FIG. 1.
Figure 16:
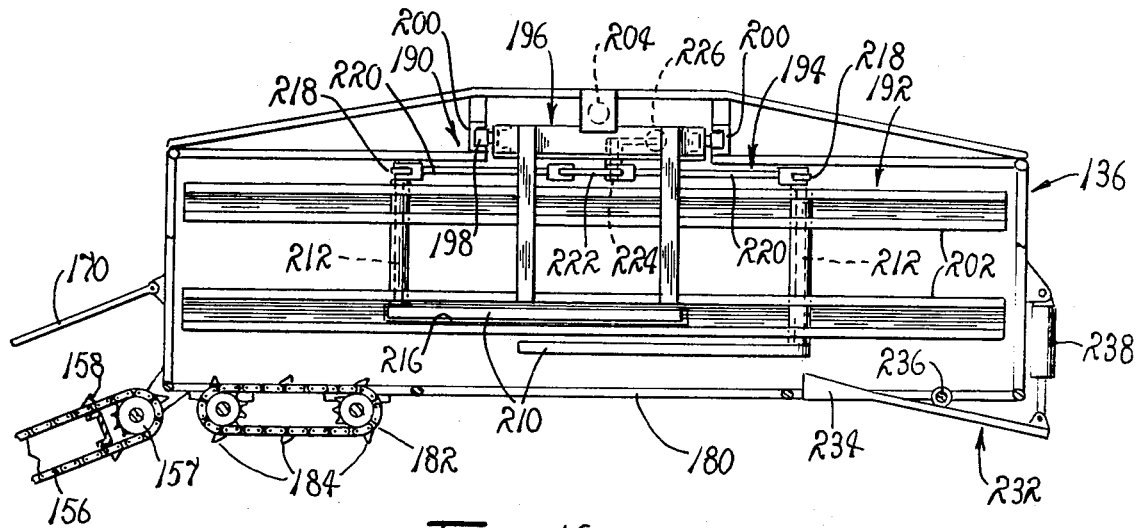
FIG. 16 is a partial side elevational view showing the bale stacking mechanism of applicant's invention.
Figure 17:
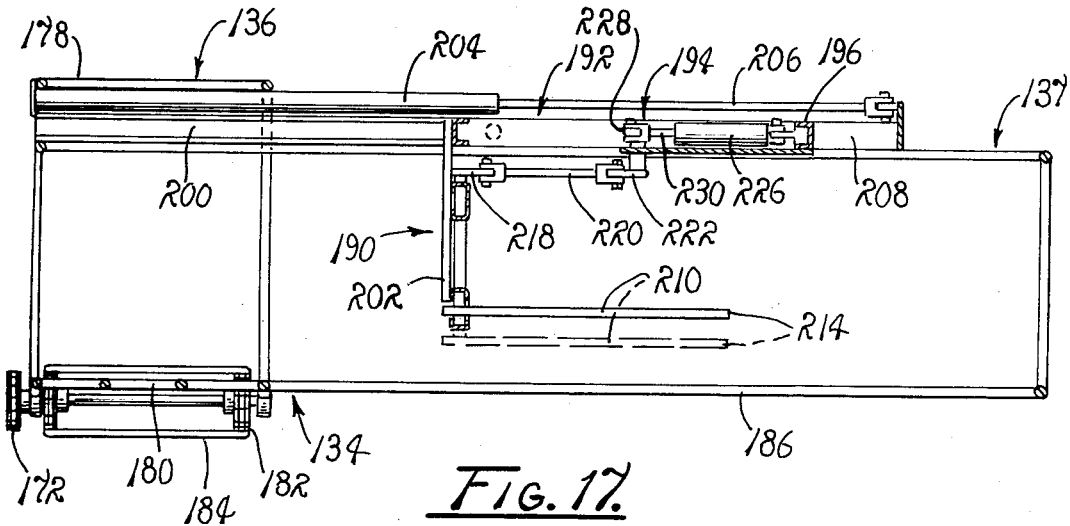
FIG. 17 is a partial end elevational view showing the stacking mechanism in FIG. 16.
Figure 18:
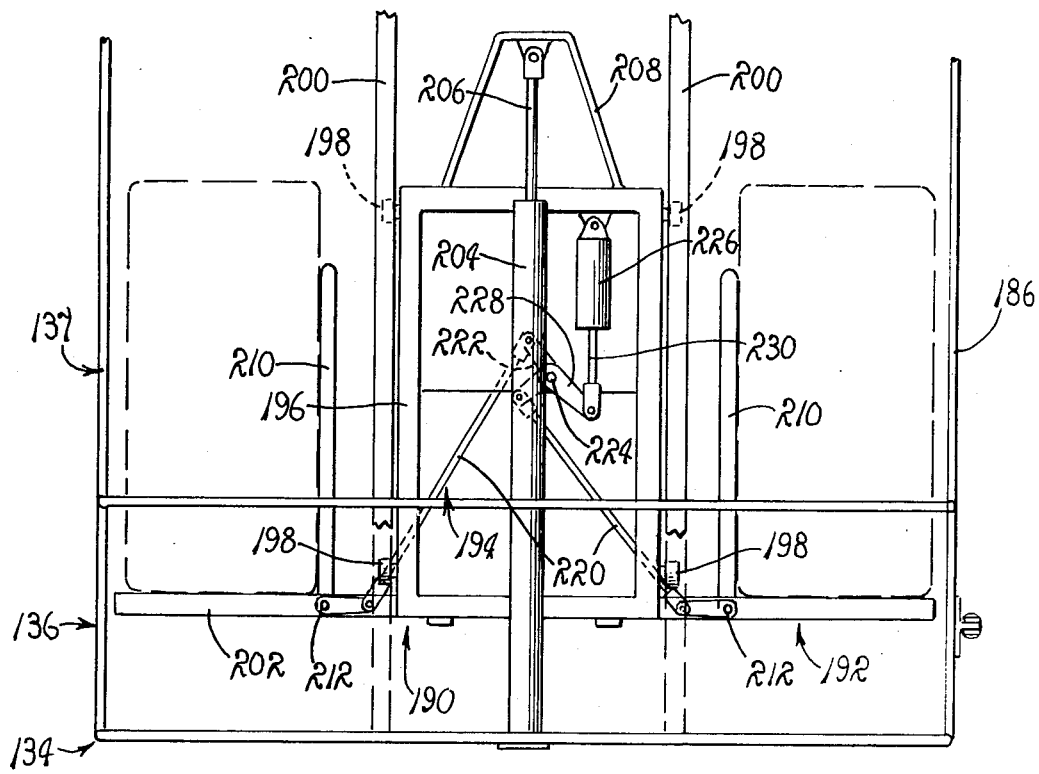
FIG. 18 is a partial plan view of the bale stacking mechanism in FIG. 16.
Figure 19:
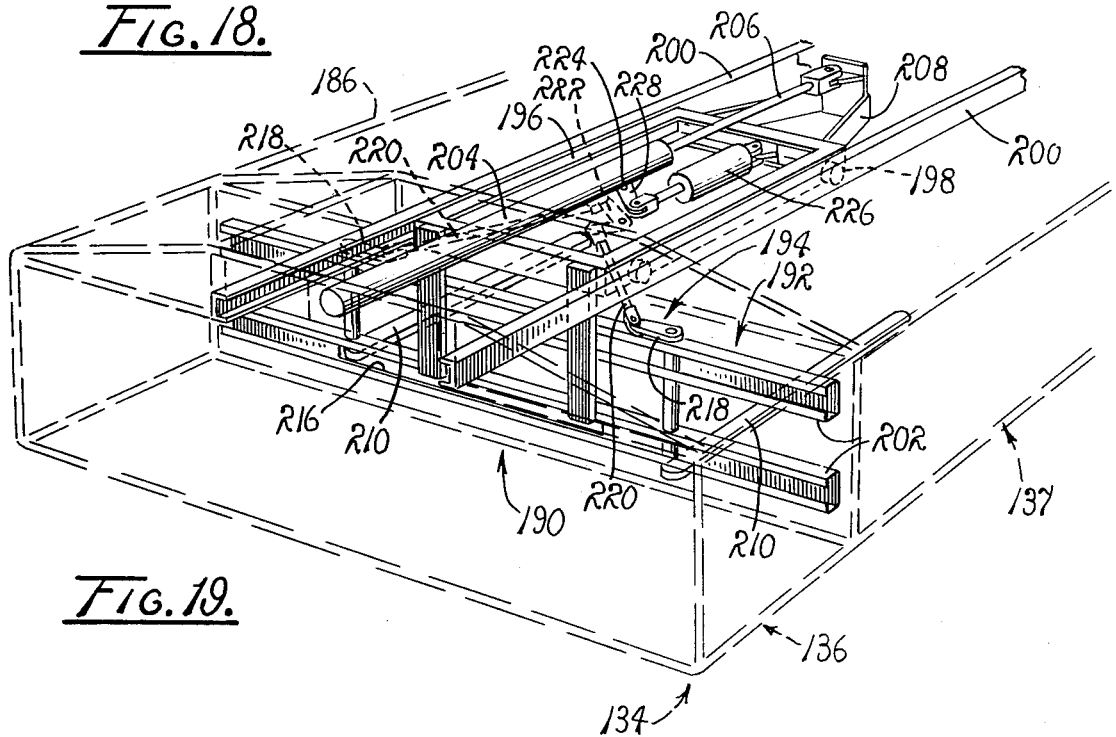
FIG. 19 is a partial perspective view of the bale stacking mechanism in FIG. 16.

The auxiliary pusher 65 has an auxiliary carriage 69 which is movably mounted on auxiliary carriage tracks 70 in the main carriage 66. The auxiliary tracks 70 are disposed parallel to the main carriage tracks 67, so that the auxiliary carriage 69 is movable therealong and with respect to main carriage 66. A pair of integral auxiliary push frames 71 are mounted on the outermost portion of the auxiliary carriage 69 adjacent the side of the carriage, and project downwardly therefrom in the same manner as the main push frame 68. The auxiliary push frames 71 have a pair of tie arm shafts 72 which are vertically disposed adjacent the auxiliary carriage 69. A pair of tie arms 73 are pivotally mounted on the tie arm shafts 72 for movement from a push position generally parallel to said auxiliary push frames 71, to a tie forming position substantially normal thereto. The auxiliary push frames 71, tie arm shafts 72 and tie arms 73 are all disposed adjacent and just inboard of the main push frame 68 when the auxiliary carriage 69 is in its most outboard position with respect to main carriage 66, (see FIG. 6) and they travel inwardly with respect to the main push frame 68 when auxiliary carriage 69 moves inboard with respect to the main carriage. (see FIG. 7.)

Movement of auxiliary carriage 69 with respect to the main carriage 66 is effected by a tie actuating cylinder 74, which is interconnected between the main carriage and the auxiliary carriage, and movement of the main carriage with respect to the bale handling carriage is effected by a transfer actuating cylinder 75.

A tie rod 76 is mounted on the auxiliary carriage 69 and is interconnected between the tie arms 73 by means of elongated slots 77 which pivotally receive the vertically disposed pins 78 on the tie arms. The pins 78 on the tie arms 72 are disposed near the pivoting end of the tie arms. The tie arms also have cams 79 mounted near their pivoting ends which are disposed to engage cam bars 80 mounted on main push frame 68 on the main carriage 66, when auxiliary carriage 69 is moved inboard with respect to the main carriage. The pins 78 and cams 79 are positioned to cause pivoting of the tie arms 73 about the tie arm shafts 72 through a 90° angle when the auxiliary carriage is caused to move inboard with respect to main carriage 66 by actuation of tie actuating cylinder 74.

The tie rod 76 is mounted on the auxiliary carriage 69, which permits its movement with respect to the main carriage 66. The tie actuating cylinder 74 is attached to the auxiliary carriage 69 so that actuation of the tie actuating cylinder draws the auxiliary carriage inboard and causes inward movement of the tie rod. The inward movement of the tie rod 76 starts the pivoting of tie arms 73 and also draws the auxiliary carriage somewhat inboard with respect to the main carriage 66, causing cams 79 to engage cam bars 80 and further effectuate the pivoting of the tie arms.

To return the tie arms 73 to their normal positions parallel to the auxiliary push frames 71, return cams 81 are provided which engage the cam bars as the auxiliary carriage is moved outwardly with respect to the main carriage, and effectuate their pivotal movement in the opposite direction. Also, the outward push of tie actuating cylinder 74 causes tie rod 76 to move outwardly with respect to the auxiliary carriage 69 and the resultant movement of the downturned ends 78 in the slots 77 further assists the pivotal return of the tie arms.

The distance of travel of the auxiliary carriage 69 with respect to the main carriage 66 is substantially equal to the travel distance of the main carriage with respect to the tier support frame 51, so that the total inboard travel of the auxiliary push frames 71 with respect to the tier support frame will be doubled when both the main carriage and auxiliary carriage are drawn to their innermost positions.

To facilitate the alternate positioning of bales in the tiers in which ties are formed by means of the tie arms 73, a center shop 82 is provided in the bale receiver 36. The center stop 82 has a stop lever 83 pivotally mounted in the support floor 48 of the bale receiver on a center stop mounting shaft 84. A lever arm 85 is affixed to the center stop mounting shaft 84 and connected by appropriate linkage to a center stop actuating cylinder 86. The center stop 82 is normally positioned flush with support floor 48 but on actuation of center stop actuating cylinder 86 is pivoted to project above the support floor and stop the travel of bales in the bale receiver at a position approximately centered about the transverse center line of the bale receiver and tier support.

To support the tiers of bales dropped out of the tier support 37, load bed 87 is provided below the tier support on the chassis 11. The load bed 87 is disposed rearwardly of the loading mechanism 13 and between the lift frames 29 of the stacking mechanism 12, and provides a support area substantially equal in size to an eight bale tier.

LOADER

The loading mechanism 13 has a generally vertical loader lift frame 88 which is mounted on a chassis 11 just rearward of the operator's platform 23 and forward of the forwardmost portion of the bale handling carriage 34. The loader lift frame 88 is telescopically extendable in the same manner as the stacker lift frames 29 and is actuated by a hydraulic loader lift cylinder 89. A pair of longitudinally extending squeeze arms 90 are mounted on the loader lift frame 88 by means of a telescopic loader cross frame 91 and are normally disposed just outwardly of each side of the load bed 87. These squeeze arms 90 are drawn together hydraulically actuated squeeze cylinder 92 which is interconnected between the telescopic sections of loader cross frame 91, and engage and squeeze a tier of bales disposed between them on the load bed 87 as hereinafter more fully described. The loader cross frame 91 and the squeeze arms 90 are carried up and down on the loader lift frame 88 by track and rollers 93 on the telescopic stations. The loader lift frame 88 is mounted on a loader dolly 94 which, in turn, is movably disposed in loader tracks 95 on the chassis, to permit longitudinal travel of the loader dolly, with the loader lift frame and squeeze arms, to the rearmost portion of the chassis and back again. This travel of the loader dolly 94 is powered by a hydraulic loader dolly motor 96 which operates cables 97 disposed in the tracks 95 by means of reels 98 mounted on a loader drive axle 99. The loader dolly motor 95 is controlled by the operator from the operator's cab 23.

The loader lift frame 88 is pivotally mounted in the loader dolly 94 and is supported in a generally vertical position by a pair of tilt actuating cylinders 100. The tilt actuating cylinders 100 are interconnected between the longitudinal frame 14 and the lower portion of each of the stanchions of the loader lift frame may be tilted from a true vertical position by actuation of the cylinders.

HYDRAULIC SYSTEM

As best shown in FIG. 11, the hydraulic system 101 for operation of my bale handling device consists of a main hydraulic pump 102 which is driven by the power unit 25, and has an associated hydraulic reservoir 103. The hydraulic system 101 has main feed headers 104 which supply the various hydraulic cylinders and motors and main return headers 105 to return the hydraulic fluid to the reservoir pump 103. The main feed headers 104 and main return feeders 105 are connected to circulate hydraulic fluid to the various actuating cylinders and motors as shown, and control valves 106 are associated with each of the cylinders and motors and connected for manual control by the operator from the operator's cab 23. The control valves 106 may also be arranged for automatic triggering by trip switches where desired in the manner well known in the art. The hydraulic system 101 also has an equalizer valve 107 to equalize the pressure in the main feed headers 104.

The hydraulic motor 108 is disposed to drive the chain conveyor 43 of the bale lift 35 and the rollers 49 in the forward end 46 of the bale receiver 36.

OPERATION

In operation, my bale handling device 10 functions as follows. The bale handling device is driven by the operator to a place where a row of bales has been left in the field by the harvester. The bale lift 35 is stored in its folded position during this travel to prevent interference with objects on the ground. The chassis 11 is then lined up with a path adjacent the row of bales and the bale lift 35 is extended by operator actuating the fold actuating cylinder 41. With the bale lift so extended the ground wheels 42 on the lower portion 39 of the bale lift are brought into contact with the ground.

Next, the operator maneuvers the chassis 11 so that the first bale to be lifted is brought into contact with the lower portion 39 of the bale lift 35. The chain conveyor 43 and rollers 49 are then placed in operation by actuating the hydraulic motor 108 and the bale is engaged by the teeth 44 and carried up the bale lift to the forward end 46 of bale receiver 36. At the forward end 46 the bale is engaged by the paddles 50 and the rollers 49 and driven rearwardly along the support floor 48 of the bale receiver.

The operator then maneuvers the chassis 11 to bring the lower portion 39 of the bale lift 35 into engagement with a second bale and this bale is carried up the bale lift, deposited on the rollers 49 of the bale receiver and driven rearwardly onto the bale receiver support floor 48. As the second bale is driven rearwardly into the bale receiver 36 it is brought into abutting end to end contact with the first bale, and drives the first bale further to the rear of the bale receiver.

With two bales thus deposited in the bale receiver 36, the operator actuates the transfer actuating cylinder 75 which drives the main carriage 66 of the transverse pusher mechanism 63 inwardly along the main carriage tracks 67 and brings the main push frame 68, auxiliary push frames 71 and the tie arms 73 into engagement with the outside of the bales. As the main carriage 66 travels inwardly, the main push frame 68 slides the bales inwardly from the bale receiver onto the retractable floor 52 of the tier support 37. The travel of the main carriage 66 is sufficient to carry the bales far enough onto the tier support floor 52 to clear the bale receiver.

The operator then maneuvers the chassis 11 to engage, lift, and deposit two more bales in the bale receiver in the manner just described. Then he again actuates the transfer actuating cylinder 75 which causes these bales to be slid onto the retractable floor 52 like the first. As the second pair of bales slide onto the retractable floor they engage the first pair of bales and slide them farther inboard.

This operation is repreated twice more, each time positioning another pair of bales on the retractable floor 52 of the tier support adjacent the preceding pair. At this point, the tier support floor 52 contains four pairs of bales, each pair being disposed in abutting end to end alignment and positioned longitudinally with respect to the longitudinal frame 14. The eight bales so positioned form the first tier. The bale handling carriage 35 is in its lowest position during this operation so that the tier support floor 52 is positioned just above the load bed 87.

To clear the first tier from the bale handling carriage 34, the operator actuates the linkage cylinder 62 which draws the two doors 63, which form the tier support floor 52, apart and up the door tracks 55 into the upper path portion 59. As the doors are drawn out from beneath the supported tier of bales, the bales drop a short distance onto the load bed 87. When the full tier of bales has been dropped, the operator actuates the lift frame actuating cylinders 31 to move the bale handling carriage 34 upward to a point where its lowermost portion is slightly above the top of the tier of bales just dropped. The doors 53 are then closed again to form the tier support floor 52 and the tier support 37 is ready to receive a second tier of bales.

A second tier of bales is then formed in the tier support, in the same manner as the first, and the doors 53 are retracted to drop this second tier onto the top of the first tier. The operator then raises the bale handling carriage 34 to a point where it just clears the second tier and closes the doors to again re-form the tier support floor 52.

The formation of the third tier of bales is then commenced by again carrying bales up the bale lift 35 and delivering them to the bale receiver 36. Since in the usual stack, the third tier and each alternate tier thereafter is required to be tied, the handling of the bales by the bale receiver is now somewhat different. The first pair of bales are again delivered to the bale receiver in the same manner as previously described. However, instead of being pushed transversely from the bale receiver 36 onto the tier support floor 52, as previously described, the bales are turned through 90° by the tie arms 73 which dispose them adjacent the outermost portions of the tier support frame 51 and are then pushed onto the tier support floor 52 by the transverse pusher mechanism 63.

The tie arms 73 are caused to turn the bales in this manner by actuating the tie actuating cylinder 74 which draws the tie rod 76 inwardly and starts the tie arms pivoting about the tie arm shafts 72. Further draw by the tie actuating cylinder 74 causes inward movement of the auxiliary carriage 69 with respect to the main carriage 66 and brings cams 79 into engagement with cam bars 80 to further effectuate the pivoting of the tie arms. The auxiliary push frames 70 slide the bales from the bale receiver onto the tier support floor 52 as the auxiliary carriage 69 completes its inward travel in auxiliary carriage tracks 70. (See FIG. 9).

At this point the bales are disposed at the forwardmost and rearwardmost portions of the tier support floor in alignment with the transverse support frame 28 and with their trailing ends adjacent the bale receiver. In order to make room for turning the next pair of bales in a similar manner, it is necessary to drive the first pair of bales further across the tier support floor until the center of the bales is located approximately at the longitudinal center of the tier support.

This extra distance of transverse travel is effectuated by then actuating the transfer actuating cylinder 75 which draws the main carriage 66 inwardly in the main carriage tracks 67 while the auxiliary carriage 69 remains in its inwardmost point of travel.

The next pair of bales delivered to the bale receiver are turned 90° in the same manner as the first pair, and are pushed transversely onto the tier support floor 52 by the auxiliary pusher 65. As the forward ends of the second pair of bales engage the rearward ends of the first pair of bales, the first pair of bales is carried further across the tier support floor and into engagement with the containing wall on the far side. At this point the tier support floor 52 has four bales, one pair abutted end to end at the forwardmost portion, and the second pair similarly abutted at the rearwardmost portion. With the bales so positioned a center opening exists between the pairs of bales just slightly larger than a bale length. The slight downward incline in the lower path portion 58 of the door tracks 55 assists in maintaining the two pairs of bales in these positions.

When the next bale is received by the bale receiver, the operator actuates the center stop 82 which stops the bale at approximately the center of the bale receiver and in alignment with the center opening between the two pairs of bales in the tier support. The main pusher 64 is then actuated and the single bale is slid transversely onto the tier support floor between the two pairs of bales previously turned and deposited there.

Figure 5:
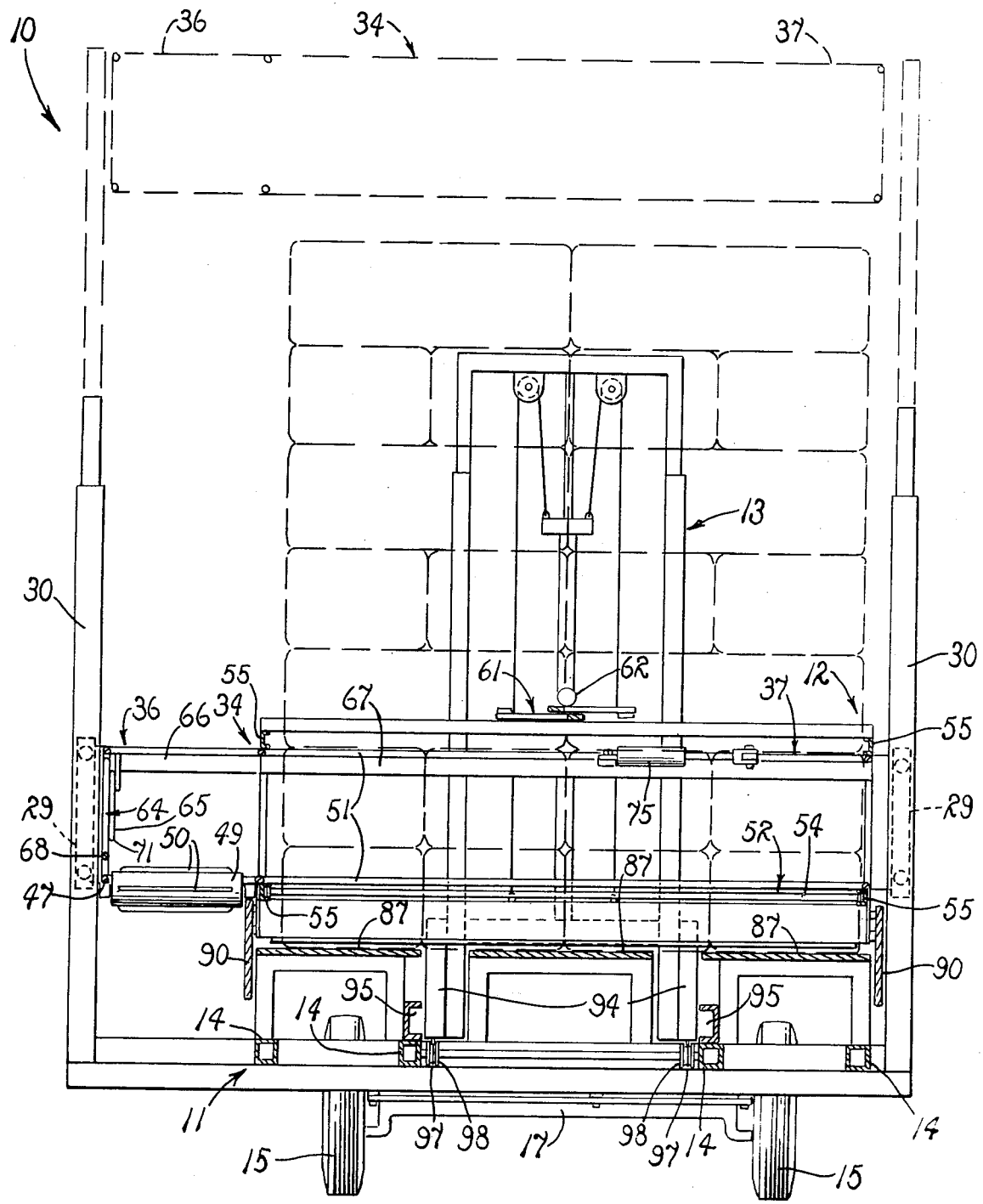
FIG. 5 is a rear cross-sectional view showing the loading mechanism of my first embodiment.

This same operation is repeated for the next three bales, and as each bale is slid transversely into the tier support, it forces the preceding bales farther across the tier support floor. When four bales have been thus positioned, the third tier of eight bales is completed. As best illustrated in FIG. 5, the bales in this tier overlap and "tie" the junctions between the bales in the two prior tiers.

The fourth tier is then formed in the same manner as the first and second tiers, the fifth tier is formed in the same manner as the third tier, the sixth tier is formed in the same manner as the fourth tier, and the seventh tier in the same manner as the third tier, until a complete seven tier stack is made.

After each tier is completed the tier support floor 52 is retracted by driving the doors 53 into the upper path portion 59 of the door tracks 55 and the tier is dropped a short distance from the tier support onto the tier below it. The bale handling carriage is raised to clear the uppermost portion of the dropped tier and the doors are driven back to re-form the tier support floor 52. When the last tier of the stack has been completed and dropped by the tier support, the bale handling carriage 34 is lifted further to clear the uppermost portion of the stack. At this point the loading mechanism 13 is brought into operation to drop the stack to the ground, or load it on a truck bed or into position in a larger storage stack.

The operation of the loading mechanism 13 is as follows. The operator actuates the loader lift cylinder 89 to position to squeeze arms 90 co-planar with the bottom tier of the stack with clearance above the load bed 87. Then squeeze cylinder 92 is actuated which moves the squeeze arms 90 toghether to squeeze the bottom tier of the stack with sufficient force to provide lifting engagement. Next, the operator again actuates the loader lift cylinder 89 to lift the 56 bale stack a small distance above the load bed. Then he actuates the loader dolly motor 96 which draws the loader dolly 94 toward the rear of the chassis 11 carrying the stack of bales.

When the loader dolly 94 reaches the rear of the chassis, the bale stack will clear the chassis and the bale handling carriage 34, and the stack may be lifted or lowered as desired. If the stack is to be lifted to a point which requires extension of the loader lift frame 88, this is effected by the load lift frame actuating cylinder 89.

To hold the stack more securely on the loading mechanism, the upper portion of loader lift frame 88 may be tilted away from the stack by the tilt actuating cylinders 100 to tip the stack into the load lift frame.

After the stack is formed it can also be transported by the chassis for reasonable distances before being loaded or placed for storage.

When the stack has been unloaded from my bale handling device and placed in the desired location, the operator actuates the squeeze cylinder 92 to expand the squeeze arms 90 and release the stack. The loading mechanism may then be returned to its original position behind the operator's cab by actuating the loader dolly motor 96 to retract the loader dolly 94.

The loading mechanism 13 can also be used to pick up a stack already formed, and load it onto the load bed 87. The stack can then be transported by the chassis 11 to a different location and unloaded again. When only the loading mechanism 13 of my bale handling device is to be used, the stacking mechanism 12 can be removed from the chassis 11 and stored.

SECOND EMBODIMENT

Having described the first preferred embodiment of my invention, I will now describe in detail a second embodiment generally similar to the first but with certain material differences.

The second preferred embodiment of my bale handling device is shown in FIGS. 12 through 20 in which it is referred to generally by the numeral 110. The bale handling device 110 has a mobile, self propelled chassis 111 substantially identical to the chassis 11 of my first embodiment. Mounted on the chassis 111 are a stacking mechanism 112 and a loading mechanism 113. Since the chassis 111 of the second embodiment has the same elements and features as the chassis 11 of my first embodiment, the parts of the chassis are identified by the same reference numerals as used in my description of the chassis 11 and reference is hereby made to that description for an understanding of these parts and their interrelationship.

The loading mechanism 113 of my second embodiment is also substantially identical to the loading mechanism 13 of my first embodiment and the parts of this portion of the device are, therefore, also identified by the same reference numerals as used in my description of the loading mechanism 13 and reference is hereby made to that description for an understanding of these parts and their interrelationship.

The stacking mechanism 112 of my second embodiment also has certain features which are quite similar to the stacking mechanism 12 in my first embodiment, however, it has other features which are substantially different. For those features which are similar to their counterparts in the stacking mechanism 12, I have used the same reference numerals for the parts and hereby make reference to the description of my first embodiment for an understanding of their interrelationship. For those features which are substantially different, I have assigned new numerals to identify the parts and will describe their interrelationship in detail hereafter.

The stacking mechanism 112 of my second embodiment is mounted on the transverse support frame 28 by means of a pair of vertically disposed lift frames 29. These lift frames 29 are formed and operate in the same manner as previously described with respect to my first embodiment.

A bale handling carriage 134 also is mounted between the lift frames 29 and carried up and down with respect to the transverse support frame 28 in the same manner as previously described. However, the bale handling carriage 134 in this second embodiment consists of a bale lift 135, a bale receiver 136, and a tier container 137.

The bale lift 135 is connected to the forward end of the bale receiver 136 and extends downwardly therefrom to ground level to receive and convey bales from the field to the bale receiver. As best shown in FIGS. 12, 13 and 14, the bale lift 135 has an upper section 138 and a lower section 139, the adjoining ends of which are assembled for relative longitudinal movement. The upper section 138 has an adjoining end 140 which is positioned below the adjoining end 142 on the lower section 139. The adjoining ends 140 and 142 are moveably connected by means of a pair of lower connector arms 144 and a pair of upper connector arms 146. The lower connector arms 144 are each rigidly attached at their upper ends to the lower section 139 adjacent the adjoining end 142 and have rollers 148 rotatably mounted on their lower ends which run in tracks 150 mounted on the upper section 138. The upper connector arms 146 are each rigidly attached at their lower ends to the upper section 138 and have rollers 152 rotatably mounted on their upper ends which run in tracks 154 on the lower section 139. The lower section 139 has a chain conveyor 156 which is movably mounted on sprockets 157 at each end of the lower section and has a plurality of spaced teeth 158 which engage bales and carry them up the lower section and has a plurality of spaced teeth 158 which engage bales and carry them up the lower section to a point where they fall onto the upper section 138. The upper section 138 has a pair of chain conveyors 160 mounted on sprockets 162 at each end of the upper section and positioned to straddle the lower section chain conveyor 156. The chain conveyors 160 have a plurality of teeth 164 which engage bales from the lower section and carry them up to the bale receiver 136.

To guide bales resting in the field into the bale lift 135, the lower end of the bale lift has guide flanges 165 which flair outwardly to form a funnel shaped entrance and ground skids 166 which slide along the ground as the bale handling device moves forward and maintain the lower end of the bale lift at a proper level for engaging bales. Also, as best shown in FIG. 12, a bale lift support frame 168 is pivotally mounted on the chassis 111 and connected to the lower end of the bale lift The bale lift support frame is pivotable by means of a hydraulic cylinder to lower and raise the lower end of the bale lift.

To keep bales on the bale lift, and in proper alignment, a pair of guide rails 170 are provided which extend along the longitudinal edges of the bale lift a short distance above the bottom.

At the upper end of the bale lift 135, a transfer chain conveyor 172 is provided with teeth 174 which engage bales on the bale lift and transfer them to the bale receiver 136.

The bale receiver 136 has an elongated frame housing 178, generally rectangular in cross section, which is disposed parallel to but outwardly from the longitudinal frame 14. The bale receiver has a support floor 180 of sufficient length to contain two bales in abutted end to end alignment which is disposed to receive bales from the upper end of the bale lift 135 via the transfer chain conveyor 172.

To move bales into the bale receiver 136 from the transfer chain conveyor 172, a bale receiver chain conveyor 182 with bale engaging teeth 184 is provided in the support floor 180. The bale receiver chain conveyor 182 engages bales delivered by the transfer chain conveyor 172 and carries the bales longitudinally along the support floor 180 toward the rear of the bale receiver 136, the next bale carried into the bale receiver is forced into abutting end to end alignment with the first bale by the bale receiver chain conveyor 182, driving the first bale further to the rear of the bale receiver.

The tier container 137 of the bale handling carriage 134 is disposed transversely inboard of the bale receiver 136 and has a generally rectangular frame 186 of sufficient size to contain a tier of eight bales. The frame 186 is formed integrally with the frame housing 178 of the bale receiver and has the same general length and height, but is open at the bottom. The frame 186 is generally centered over the longitudinal frame 14 of the chassis 111 and is disposed directly above a load bed 188 provided on the chassis 111 to support a stack of bales.

The tier container 137, being part of the bale handling carriage 134, is movable up and down with respect to the chassis 111 as previously explained, and is disposed in its lowermost position with the frame 186 just above the load bed 188 when the bale handling device 110 begins its operation. In this position, bales transferred from the bale receiver 136 to the tier container 137 drop a short distance onto the load bed 188.

To transfer bales from the bale receiver 136 to the tier container 137, a bale transfer mechanism 190 is provided which consists of a transverse pusher 192 and a bale turning mechanism 194. The transverse pusher 192 has a transfer carriage 196 rotatably mounted by means of rollers 198 on a pair of parallel tracks 200 which are disposed transversely of the longitudinal frame 14 and extend across the top of the bale receiver 136 and the tier container 137. The transfer carriage 196 has a generally rectangular push frame 202 attached at its outboard end which extends downwardly from the transfer carriage into the bale receiver 136. The push frame 202 is of proper size and shape to engage any bales disposed in the bale receiver 136 but small enough to pass from the bale receiver 136 into the tier container 137 as the transfer carriage 196 moves on the tracks 200 without interference from the tier container frame 186.

A transverse pusher actuating cylinder 204 is mounted on the top of the bale receiver frame housing 178 and extends inboard over the tier container frame 186 with its plunger 206 attached to the inboard end of the transfer carriage 196 by means of a connecting frame 208. The transverse pusher actuating cylinder 204 is supplied through a diverting valve, hereinafter more fully described, and has a long stroke when the diverting valve is closed but a short stroke when the valve is open.

The bale turning mechanism 194 consists of a pair of tier arms 210 which are each pivotally mounted on tie arm shafts 212 journaled in opposite ends of the push frame 202. The tie arms 210 are normally positioned to extend toward each other from their pivotal mountings in flush alignment with the push frame 202. The length of the tie arms 210 is such that their distal ends 214 would overlap in this position but the tie arms are vertically offset a sufficient distance to avoid this condition. Also, a cutout portion 216 is provided in the push frame structure to accommodate the upper tie arm.

To pivot the tie arms 210 from their normal position in flush alignment with the push frame 202 to an extended position substantially normal to the push frame, crank arm 218 is attached to the upper end of each of the tie arm shafts 212

The crank arms 218 are in turn each connected by tie rods 220 to an actuating lever 222 which is pivotally mounted on the transfer carriage 196 by means of a journaled actuating shaft 224. The actuating shaft 224 is rotated by a tie arm actuating cylinder 226 through a cylinder crank arm 228. The tie arm actuating cylinder 226 is mounted on the transfer carriage 196 and has a plunger 230 which is connected to the cylinder crank arm 228.

To facilitate alternate positioning of bales in the bale receiver 136 in order to form tie tiers in the bale stack, a center stop 232 is porvided in the bale receiver 136. The center stop 232 has a stop lever 234 pivotally mounted in the support floor of the bale receiver on a center stop mounting shaft 236. A lever arm is affixed to the center stop mounting shaft 236 and connected by appropriate linkage to a center stop actuating cylinder 238. The center stop 232 is normally positioned flush with the bale receiver support floor but on actuation of the center stop cylinder 238 is pivoted to project above the floor and limit the travel of bales in the bale receiver to a position approximately centered about the transverse centerline of the bale receiver and tier container.

The operation of my second embodiment is generally the same as for my first embodiment except for variations in the operation of the bale lift 135 and the tier container 137 which I will now explain.

Since the bale lift 135 in my second embodiment has two sections 138 and 139 which are longitudinally movable relative to one another, its manner of adjusting to changes in the vertical positioning of the bale receiver 136 is somewhat different than in my first embodiment. The bale lift in my second embodiment has the upper end of the upper section 138 attached to the bale receiver 136 and the lower end of the lower section 139 connected to the bale lift support frame 168. When the bale receiver 136 is in its lowest position ready to form the first tier of a stack it is closer to the bale lift support frame 168, and as the bale receiver moves upward with the tier container 137 to form additional tiers in the stack its distance from the bale lift support frame 168 increases. The bale lift 135 compensates for this change of distance by relative movement between the adjoining ends of the upper section 138 and lower section 139. When the bale receiver 136 is in its lowest position the adjoining ends 140 and 142 overlap to the maximum extent possible, and as the bale receiver moves upwardly this overlap decreases by the travel of the rollers 148 on the lower section 139 in the tracks 150 of the upper section 138 and the rollers 152 on the upper section 138 in the tracks 154 of the lower section 139. The upper connector arms 144 and lower connector arms 146 are positioned to permit the travel necessary to accommodate all positions of the bale receiver.

The operation of my second embodiment is also different than that of my first embodiment in the manner of forming the tiers of the bale stack and inserting the tie tiers. In my second embodiment the first tier is formed as follows. After the first two bales have been lifted into the bale receiver 136 by the bale lift 135 and are disposed in longitudinal end to end alignment, the transverse pusher actuating cylinder 204 is actuated on the short stroke cycle and extends the plunger 206 to drive the transfer carriage 196 transversely of the longitudinal frame 14. As the transfer carriage moves transversely by the rollers 198 traveling in the tracks 200 the push frame 202 engages the two bales in the bale receiver 136 and pushes them into the tier container 137 a sufficient distance to clear the bale receiver. Since the tier container 137 has an open bottom, and the support floor 180 of the bale receiver is positioned only a small distance above the load bed 188 the two bales drop onto the load bed. The transfer carriage 196 and push frame 202 are then returned to their normal deactivated position by retracting the plunger 206 of the transverse pusher actuating cylinder 204.

To complete the first tier, the operation just described is repeated three more times until eight bales have been transferred from the bale receiver 136 to the load bed 188. As each additional pair of bales is thus transferred the bales previously transferred are engaged by the new pair of bales and pushed further over transversely on the load bed. The bales on the load bed 188 are contained in their proper position to form the desired tier by the frame 186 of the tier container 137. When all eight bales have been transferred the first pair of bales engage the frame 186 of the tier support 137 on the side opposite the bale receiver 136 where the trip lever which controls the elevating cycle of the bale handling carriage 134 is actuated, causing the bale handling carriage to be elevated the distance of one tier of bales.

The second tier of bales is then formed in the same manner as the first tier and this operation continues until the operator desires to form a tie tier. Such a tier is usually formed as the third and fifth tiers of a seven tier stack.

A tie tier is formed by my second embodiment as follows. After a first pair of bales has been delivered and positioned in the bale receiver in end to end alignment, the tie arm actuating cylinder is actuated pivoting the tie arms 210 through the actuating lever 222 tie rods 220 and crank arms 218, from their normal position aligned flush with the push frame 202 to their tie position substantially at right angles to the push frame. This pushes the two bales in the bale receiver through oppositely directed 90° turns and positions them apart longitudinally a distance slightly greater than one bale length and with their formerly abutting ends directed into the tier container 137. The transverse pusher actuating cylinder 204 is then actuated for a long stroke and pushes the turned bales further into the tier container a distance sufficient to permit the turning of a second pair of bales in the same manner without interference from the first pair.

Next, two more bales are delivered to the bale receiver 136, turned by pivoting the tie arms 210 in the same manner, and pushed transversely into the tier container 137 by the push frame 202. Since the second pair of bales, when turned abutted the ends of the first pair of bales as they are pushed transversely into the tier container, the push frame 202 only travels its short stroke which is sufficient to drive the far ends of the first set of bales against the tier container frame 186 on the side opposite the bale receiver.

At this point, there are four bales in the tier container, two at the forward end aligned transversely in end to end relationship and two at the rearward end aligned in the same manner and space slightly more than a bale length from the forward end bales. To complete the tie tier four more bales are positioned individually between the forward and rearward pairs but disposed longitudinally with respect to the frame 14 and four across. This is accomplished by delivering bales one at a time to the bale receiver 136, stopping them about midway along the support floor 180 by means of the center stop 232 and then pushing them transversely between the forward and rearward pairs of turned bales by means of the push frame 202 in substantially the same manner as in my first embodiment.

By thus forming normal tiers and tie tiers as desired, a seven tier stack is formed on the load bed 188. This stack may then be transported, unloaded and even reloaded by the loading mechanism 113 in the same manner as in my first embodiment.

To provide the power and control for the operation of my second embodiment the power and control system 240, best shown in FIG. 20, is utilized.

The power and control system 240 has a hydraulic fluid reservoir 242 from which fluid is delivered to the system by a pump 244 via line 246. From the pump 244 the fluid is conducted to a loader-stacker selector valve 248 via a relief valve 250 through hydraulic line 252. The loader-stacker selector valve 248 is manually operable to passed fluid to either a bank of loader control valves 254 or a bank of stacker control valves 256, via a main hydraulic line 258. The main hydraulic line 258 passes through the stacker control valves 256 to a stacker operational valve 260 but is diverted to other lines when the stacker control valves are actuated. One of the stacker control valves is bale lift actuator valve 262 which controls the hydraulic actuating cylinders 31 that elevate the bale handling carriage 134 via line 265; and the third is a bale lift lower conveyor actuating valve 266 which controls the hydraulic drive motor 268 for the lower section chain conveyors 160 via line 269. The bale lift lower conveyor actuating valve 266 when actuated merely diverts the hydraulic fluid passing to the stacker operational valve 260 from main line 258 to line 269 thus passing it through the drive motor 268.

The stacker operation valve 260 passes the hydraulic fluid through the valve in main line 256 unless the valve is actuated into one of its two operational positions, extend and retract. Until the stacker operational valve 260 is actuated the hydraulic fluid in main line 258 passes through the bale lift upper section conveyor drive motor 270 and back to the reservoir 242 via elevator actuating valve 272, the operation of which will be explained later. The stacker operational valve 260 is actuated by a trip mechanism 274 which is mounted on the rearward portion of the bale receiver 136 and extends into the tier container 137 along the top of frame 186. Since the stacker operation valve 260 is actually located in physical association with the trip mechanism 274 but is shown elsewhere in the schematic of FIG. 20 for convenience in layout, the valve is also shown in phantom in its true location.

The trip mechanism 274 has an extend trip lever 276 located in the rear portion of the bale receiver 136 which is actuated when two bales have been delivered to the bale receiver in abutting end to end alignment. Actuation of the extend trip lever 276 actuates the stacker operation valve 260 to its extend position. In this position the hydraulic fluid in main line 258 is diverted to extend line 278 and retract line 280 is connected to the reservoir 242 via drain line 282. The extend line 278 carries fluid to a push-tie selector valve 284 which diverts the fluid either to a push line 286 or a tie line 288. The push-tie selector valve is switched between its two positions by a pneumatic actuating system controlled from the operator's cab which is not shown.

Where a normal tier rather than a tie tier is being formed, and the first pair of bales in the bale receiver are to be pushed transversely into the tier container by push frame 202 rather than turned by tie arms 210, the push-tie selector valve 284 is placed in its push position thus feeding the hydraulic fluid to the extend end of the transverse pusher actuating cylinder 204 via push line 286. This, of course, extends the plunger 206 of the actuating cylinder 204 carrying the push frame 202 on the transfer carriage 196 into engagement with the bales, and also forces fluid out of the retract end of the cylinder on push-retract line 290. Push-retract line 290 is connected to retract line 280 which is connected through stacker operation valve 260 and drain line 282 to the reservoir 242. The push-retract line 290 is also connected to tie-retract line 292 from the retract end of tie arm actuating cylinder 226, which due to the resistance in the retract line 280 causes a slight amount of force to be delivered to this cylinder to hold it in its retract position while the transverse pusher actuating cylinder 204 is extending.

To terminate the extension of the transverse pusher actuating cylinder 204 and retract it to its deactivated position a short stroke trip 294 and a long stroke trip 296 are provided in the trip mechanism 274 which operates stacker operation valve 260. These trips are positioned for engagement by the push frame 202 as it moves transversely from the bale receiver 136 into the tier container 137. Normally, the short stroke trip 294 is engaged by the push frame 202, however, by means of a pneumatic control system operable from the operator's cab the short stroke trip 294 can be displaced to avoid engagement by the push frame 202 in which case the push frame travels further inboard until it engages the long stroke trip 296. This arrangement provides the short stroke-long stroke facility of the transverse pusher actuating cylinder 204 heretofore described.

When either the short stroke trip 294 or long stroke trip 296 is engaged, the stacker operation valve is switched to its retract position which diverts the fluid in main line 258 to retract line 280 and connects extend line 278 to the reservoir 242 via drain line 282. The fluid is thus delivered to the retract ends of both the transverse pusher actuating cylinder 204 and the tie arm actuating cylinder 226, however, since only the transverse pusher actuating cylinder is extended only this cylinder is retracted but the tie arm actuating cylinder is held in its retracted position.

To deactivate the stacker operation valve 260 when the push frame 202 is retracted to its normal deactivated position a pusher stop trip 298 is mounted on the bale receiver frame housing 178 and positioned to be engaged by the push frame 202 when it is fully retracted. The pusher stop trip 298 switches the stacker operation valve 260 to its deactivated position thus reconnecting main line 258 through the valve and shutting down the push-tie mechanism. This also restarts the bale lift upper section conveyor motor 270 which is shut down by stacker operation valve 260 when it is switched to extend or retract.

To form a tie tier, the push-tie selector valve 284 is switched to tie. In this condition, when the stacker operation valve 260 is switched to extend by the engagement of bales in the bale receiver with the extend trip lever 276, the fluid in extend line 278 is delivered to tie line 288 by the push-tie selector valve 284 and enters the extend end of the tie arm actuating cylinder 226 extending its plunger 230 and pivoting the tie arms 210 to turn the bales. When the bales are turned through 90° and engage the forward and rearward portions of the tier container frame 186 the pressure in the tie line 288 rises to a point sufficient to open a pressure actuated branch valve 300 which diverts most of the fluid to the extend end of the transverse pusher actuating cylinder 204 via function line 302 and push line 286. This causes extension of the plunger 206 which carries the push frame 202 transversely into the tier container 137 and transfers the bales to the tier container. Since sufficient room must be allowed to turn the second pair of bales in forming a tie tier, the short stroke strip 294 is displaced as previously described and the transverse pusher actuating cylinder travels its long stroke to the point where the push frame 202 engages the long stroke trip 296. During this extension of both the transverse pusher actuating cylinder 204 and the tie arm actuating cylinder 226 fluid is drained from the retract ends of these cylinders into retract line 280 in the manner previously described.

When the long stroke trip 296 is actuated, the staker operation valve 260 is switched to retract and fluid is fed to the retract ends of both the transverse pusher actuating cylinder 204 and the tie arm actuating cylinder 226 via retract line 280, push-retract line 290 and tie-retract line 292. Since the push-tie selector valve 284 is in its tie position connecting the tie-retract line 292 directly to extend line 278, fluid is drained from the extend end of the tie arm actuating cylinder 226 without any substantial resistance. On the other hand, the fluid from the extend end of the transverse pusher actuating cylinder 204 drains into push-extend line 286 which is closed by push-tie selector valve 284 and must pass through junction drain line 304 and pressure actuated block valve 306 to reach extend line 278. Pressure actuated block valve 306 is arranged to open only after sufficient pressure has developed in junction drain line 304, therefore, the transverse pusher actuating cylinder 204 is blocked from retraction of the plunger 206 until the pressure actuated block valve 306 opens. This condition causes the fluid in retract line 280 to be diverted to tie-retract line 292 until full retraction of the plunger 230, and the associated tie arms 210, has been accomplish, at which point the pressure in the system increases to a point where the pressure in junction drain line 304 is sufficient to open the block valve 306 and the transverse pusher actuating cylinder 204 retracts its plunger 206 carrying the push frame 202 back to its normal deactivated position. It will thus be seen that the retracting of a tie stroke is accomplished in sequence with the tie arms 210 being retracted to their normal positions first before the push frame 202 is retracted to its normal position.

When the last bales necessary to form a tier are delivered to the tier container 137 the bales on the opposite side of the tier container from the bale receiver are driven into engagement with an elevator trip lever 308 which controls the elevator operating valve 272. When the elevator operating valve 272 is actuated it diverts fluid from the main line 258 to the cylinders 31 which elevate the bale handling carriage 134 via elevator line 310. This drives the bale handling carriage upward to a point where the elevator trip lever no longer engages the bales of the tier. At this point the elevator trip lever 308 deactivates the elevator operating valve 272 which stops the bale handling carriage in proper position to form a new tier on top of the one just formed.

The loader control valve bank 254 contains the valves which control the power system for unloading and reloading stacks of bales, and since this system is the same as in my first embodiment the essential components have been shown in phantom in FIG. 20 and reference is made to the description of my first embodiment for a detailed disclosure of their operation.

From the above detailed description of preferred embodiments of my invention, it will be understood that I have provided an extremely versatile bale handling device which will perform in an effective and efficient manner, most, if not all, of the handling operations required between the harvester and storage or transport. Although I have described only two types of tiers which are formed by my device during the stacking of bales, it is possible to form others without any substantial changes. For example, a different tier may be formed by transversely pushing the first pair of bales into the tier container by a long stroke, turning the next pair of bales and moving them to the tier container on a long stroke, inserting to center bales transversely, by use of the center stop, and finally delivering a pair of bales to the tier support transversely on a short stroke.

Also, a great deal of versatility is added by the combination of the loading mechanism with the stacker. The loading mechanism in my invention can not only unload stacks formed by the stacker but can place such stacks into position to form larger storage stacks and can load them on a truck bed or reload them from the ground back onto my device for transport. Furthermore, the stacks formed by my device are satisfactory for highway transport without modification of any kind, and all operations performed by my bale handling device can be done by one operator.

I claim:

1. A bale handling device comprising:
   a chassis having a horizontally disposed load bed thereon;
   bale stacking means operatively associated with said chassis and load bed and disposed to form a stack of bales on said load bed;
   bale stack loader means operatively associated with said chassis and load bed and disposed to engage a bale stack of the type formed by said bale stacking means, and, selectively, to move such a bale stack vertically with respect to said load bed and to transfer such a bale stack horizontally with respect to said load bed to load or unload such bale stacks on said load bed; and
   power means operatively associated with said chassis, bale stacking means, and bale stack loader means for powered operation thereof.

2. A bale handling device as described in claim 1 in which said bale stacking means includes:
   a tier support movable mounted on said chassis for vertical movement with respect thereto, said tier support having a retractable floor;
   a bale receiver disposed adjacent said tier support and interconnected therewith for simultaneous vertical movement therewith, said bale receiver having a support floor disposed co-planar with the retractable floor of said tier support;
   bale transfer means operatively associated with said tier support and disposed to engage bales on said bale receiver support floor and transfer them onto said tier support retractable floor; and
   a bale lift interconnected with said bale receiver and disposed to receive bales at the ground and transfer them to said bale receiver.

3. A bale handling device as described in claim 1 in which said bale stacking means includes:
   a tier support frame;
   a pair of oppositely disposed door tracks mounted on said tier support frame and disposed to define a generally elliptical path in a generally vertical plane with one long leg disposed generally horizontal on a lower portion of said tier support frame, and the other long leg disposed generally horizontal on an upper portion of said support frame and above said one long leg;
   a pair of doors having opposite side edges, a leading edge, and a trailing edge, said doors being supported in said tier support frame with each of said side edges mounted in one of said pair of door tracks, said leading edges disposed proximal one another and said trailing edges disposed distal with respect to said proximal leading edges;
   door actuation means interconnected with each of said doors and said tier support frame and disposed to move, upon actuation, said doors from a closed position with said doors in the lower portion of said door tracks and their leading edges in sufficiently close proximity to one another to form a floor for supporting bales, to an open position with said doors in the upper portion of said door tracks and their leading edges separated from one another a distance sufficient remove said bale supporting floor from beneath a tier of bales supported thereon;

a bale receiver disposed adjacent said tier support and interconnected therewith for simultaneous vertical movement therewith, said bale receiver having a support floor disposed co-planar with the retractable floor of said tier support;

bale transfer means operatively associated with said bale receiver and said tier support and disposed to engage bales on said bale receiver support floor and transfer them onto said tier support retractable floor to form a tier of bales thereon; and a bale lift interconnected with said bale receiver and disposed to receive bales at the ground and transfer them to said bale receiver.

4. A bale handling device as described in claim 1 in which said bale stacking means includes:

a load bed disposed horizontally on said chassis;

bale stacker support means mounted on said chassis adjacent said load bed and extending vertically upward therefrom;

tier support frame mounted on said bale stacker means above said load bed and movable vertically with respect thereto;

tier support power means interconnected with said bale support means and said tier support frame and disposed to move said tier support frame upward and downward on said bale stocker support means with respect to said load bed;

a pair of oppositely disposed door tracks mounted on said tier support frame each disposed to define a generally elliptical path in a generally vertical plane with one long leg disposed generally horizontal on a lower portion of said tier support frame, and the other long leg disposed generally horizontal on an upper portion of said support frame above said one long leg;

a pair of doors having side edges, a leading edge, and a trailing edge, said doors being supportably mounted in said tier support frame with each of said side edges movably mounted in one of said pair of door tracks, said leading edges disposed proximal one another and said trailing edges disposed distal with respect to said proximal leading edges;

door actuation means interconnected with each of said doors and said tier support frame and disposed to move, upon actuation, said doors from a closed position with said doors in the lower portion of said door tracks and their leading edges in sufficiently close proximity to one another to form a floor for supporting a tier of bales, to an open position with said doors in the upper portion of said door tracks and their leading edges separated from one another a distance sufficient remove said bale supporting floor from supporting relationship beneath said tier of bales;

a bale receiver mounted adjacent to said tier support frame and having a support floor co-planer with said tier support retractable floor and disposed to receive two bales in end to end relationship;

a transverse pusher movably mounted in tracks disposed for movement from said bale receiver into said tier support frame, said transverse pusher having bale engaging means disposed to engage bales in said bale receiver and push them from said bale receiver support floor to said tier support retractable floor when said transverse pusher moves from said bale receiver into said tier support frame;

tie forming means interconnected with said transverse pusher and disposed to engage bales in said bale receiver and rotate them in a horizontal plane through a right angle turn, said tie forming means having carriage movably mounted in tracks on said transverse pusher for movement with respect thereto, in the same direction as the path of movement of said transverse pusher, a pair of arms pivotally mounted on said carriage for movement from a first position aligned with said end to end bales, to a second position at right angle thereto, pivot cam means interconnected between said transverse pusher and said tie forming means and disposed to pivot said arms upon movement of said tie forming means carriage with respect to said transverse pusher from said first position to said second position, and return cam means interconnected between said transverse pusher and said tie forming means and disposed to pivot said arms from said second position to said first position upon movement of said tie forming means carriage with respect to said transverse pusher, in the opposite direction; and a bale lift interconnected with said bale receiver and disposed to receive bales at the ground and transfer them to said bale receiver.

5. A bale handling device as described in claim 1 in which:

said chassis is mobile and self-propelled, and is generally rectangular with a forward end, a rearward end and oppositely disposed sides;

said bale stacking means includes a load bed disposed generally horizontally on the rearward portion of said chassis, bale stacker support means mounted on said chassis adjacent said load bed and the sides of said chassis and extending vertically upward therefrom, a tier support mounted on said bale stacker support means and vertically movable up and down with respect thereto, said tier support being disposed above said load bed and having a retractable floor actuatable to drop tiers of bales formed on said retractable floor upon said load bed to form a stack of bales thereon, a bale receiver operatively associated with said tier support and disposed to receive and transfer bales into said tier support to form a tier of bales upon said retractable floor, and bale lift means interconnected with said bale receiver and disposed to transfer bales from the ground to said bale receiver;

and said bale stack loader means includes bale stack lift means disposed on said chassis forward of said load bed and extending generally vertically upward therefrom, bale stack engaging means mounted on said bale stack lift means and movable upward and downward with respect thereto, said bale stack engaging means having a pair of rearwardly extending arms disposed adjacent the sides of said chassis and load bed and actuatable to contract and squeeze bales of a bottom tier disposed on said load bed to form lifting engagement therewith, and bale stack transfer means disposed on said chassis in supporting relationship with said bale stack lift means, said bale stack transfer means having track and roller means operatively associated therewith and disposed for movement from a first position forward of said load bed to a second position rearward of said load bed and back again, and drive means operatively associated with said power means and said chassis to drive said bale stack transfer means from said first position to said second position and back again.

6. A bale handling device comprising:

a generally rectangular mobile self propelled chassis having a forward end, a rearward end and oppositely disposed sides;

a load bed disposed generally horizontally on the rearward portion of said chassis;

bale stacker support means mounted on said chassis adjacent said load bed and extending vertically upward therefrom;

a tier container frame mounted on said bale stacker means above said load bed and movable vertically with respect to said load bed;

tier container power means operatively associated with said bale stacker support means and said tier container frame, and disposed to move said tier container frame upward and downward on said bale stacker support means with respect to said load bed;

a bale receiver interconnected with said tier container frame and movable up and down therewith, said bale receiver having a support floor co-planer with said tier container and disposed to receive two bales in abutting end to end relationship;

a transverse pusher movably mounted on said bale receiver and said tier container frame and disposed for movement from said bale receiver into said tier container frame and back again, said transverse pusher having bale engaging means disposed to engage bales in said bale receiver and push them from said bale receiver support floor to said tier container frame when said transverse pusher moves from said bale receiver into said tier container frame;

tie forming means operatively associated with said transverse pusher and disposed to engage bales in said bale receiver and rotate them in the plane of said bale receiver support floor through a right angle turn;

a bale lift interconnected with said bale receiver and disposed to receive and transfer bales from the ground to said bale receiver;

bale stack lift means disposed on said chassis forward of said load bed and extending generally vertically upward therefrom;

bale stack engaging means interconnected with said bale stack lift means and vertically movable with respect thereto upward and downward, said bale stack engaging means being disposed to engage bales forming the bottom tier of a stack on said load bed and lift said bale stack from said load bed upon vertical movement with respect to said bale stack lift means;

bale lift power means operatively associated with said bale stack engaging means and said bale stack lift means and disposed to move said bale stack engaging means upward and downward with respect to said bale stack lift means; and bale stack transport means disposed on said chassis in supporting relationship with said bale stack lift means, said bale stack transport means having track and roller means disposed to move said bale stack transport means from a normal position forward of said load bed rearward along said chassis to a position rearward of said load bed and back again, and drive means interconnected with said chassis for actuating said travel of said bale stack transport means.

7. A bale handling device as described in claim 6 in which:

a retractable floor operatively associated with said tier support frame and disposed to receive and releasably support a tier of bales thereupon; and floor retracting power means interconnected with said floor and tier support frame and disposed to move, upon actuation, said retractable floor from a normal position in supporting relationship to a tier of bales disposed thereupon to a retracted position out of supporting relationship with said tier of bales to stack said tier of bales on said load bed.

8. A bale handling device as described in claim 6 in which;

said transverse pusher includes track and carriage means whereby it is movably mounted on said bale receiver and said tier container frame;

said transverse pusher bale engaging means is disposed to engage bales positioned in longitudinal alignment with said bale receiver and move said bales laterally from said bale receiver to said tier container frame upon movement of said track and carriage means;

and in which said transverse pusher also includes transverse actuating means operatively associated with said tier container frame and said track and carriage means and disposed to move, upon actuation, said track and carriage means as aforesaid.

9. A bale handling device as described in claim 6 in which:

said tie forming means is movable with respect to said transverse pusher, has pivot arm means movably mounted thereon and disposed to pivot from a first position in longitudinal alignment with said bale receiver to a second position substantially normal thereto and projecting laterally therefrom toward said tier support frame, has crank arm means operatively associated with said transverse pusher bale engaging means and disposed to effectuate said pivotal movement of said pivot arm means upon movement of said crank arm means with respect to said transverse pusher bale engaging means, has tie forming actuating means operatively associated with said transverse pusher and said tie forming means and disposed to move, upon actuation, said tie forming means with respect to said transverse pusher, and have bale stop means operatively associated with said bale receiver and disposed to control the longitudinal positioning of bales deposited therein.

10. A bale handling device as described in claim 6 in which:

said transverse pusher is movable mounted on said bale receiver and said tier container frame by means of a pair of main carriage tracks disposed to define a path of travel from said bale receiver into said tier container frame, and a main carriage movably mounted on said main carriage tracks for travel therealong;

said transverse pusher bale engaging means operatively associated with said main carriage and disposed to engage bales received in said bale receiver as aforesaid;

and said transverse pusher also includes power means operatively associated with said tier container frame, said bale receiver and said main carriage and disposed to move, upon actuation, said main carriage along said main carriage tracks;

said tie forming means includes a pair of auxiliary carriage tracks mounted on said transverse pusher main carriage and disposed in general alignment with said main carriage tracks, and an auxiliary carriage movably mounted on said auxiliary carriage tracks for travel therealong with respect to said main carriage;

said tie forming means has tie forming bale engaging means operatively associated with said auxiliary carriage disposed to engage bales received in said bale receiver as aforesaid, said tie forming bale engaging means being juxtaposed said transverse pusher bale engaging means when said auxiliary carriage tracks nearest said bale receiver;

said tie forming means has a pair of pivot arms pivotally mounted at their proximal ends on said auxiliary carriage bale engaging means, one adjacent a first of two bales received in abutting end to end relationship in said bale receiver and the other adjacent the second of said bales, said pivot arms being disposed for simultaneous pivotal movement in a plane generally parallel to and positioned above the plane of said tier container frame bottom and said bale receiver support floor through a right angle from a first position substantially parallel to the longitudinal axis of said two bales received in said bale receiver, to a second position substantially normal thereto with their distal ends directed into said tier container frame;

said tie forming means has a tie rod operatively associated with said auxiliary carriage and pivotally interconnected with each of said arms at a point near but slightly offset from their pivotal mountings;

said tie forming means have cam means operatively associated with said pivot arms and said main carriage bale engaging means and disposed to effectuate said pivotal movement of said arms upon movement of said auxiliary carriage with respect to said main carriage;

and said tie forming means also has tie forming power means operatively associated with said main carriage, and said auxiliary carriage and disposed to move, upon actuation, said auxiliary carriage with respect to said main carriage along said auxiliary carriage tracks.

11. A bale handling device as described in claim 6 in which said bale stack engaging means includes:

a cross member movably mounted on said bale stack lift means;

a pair of engaging arms extending longitudinally rearward from said cross member and telescopically mounted in said cross member for lateral movement with respect thereto;

and bale stack engaging actuating means interconnected with said cross member and said engaging arms and disposed to move, upon actuation, said engaging arms laterally inward and outward with respect to said cross member.

12. A bale handling device as described in claim 1 in which said bale stack loader means includes:

bale stack engaging means interconnected with such chassis and load bed and disposed to engage a bale stack of the type formed by said bale stacking means;

bale stack lift means interconnected with said bale stack engaging means and disposed to raise and lower a bale stack engaged by said bale stack engaging means vertically, with respect to said load bed;

bale stack transfer means interconnected with said bale stack engaging means and said bale stack lift means and disposed to move a bale stack engaged by said bale stack engaging means, horizontally, with respect to said load bed; and control means for selectively operating said bale stack engaging means, said bale stack lift means and said bale stack transfer means.

13. A bale handling device as described in claim 12 in which:

said bale stack transfer means includes track means recessed in said load bed and extending longitudinally of said chassis, a bale stack transfer carriage movably mounted on said track means for movement rearwardly and forwardly with respect to said chassis;

said bale stack lift means includes a bale stack lift support member mounted on said bale stack transfer carriage and extending vertically upward therefrom, said bale stack lift support member having track means disposed thereon and extending vertically with respect to said load bed, and a bale stack lift carriage movably mounted on said bale stack lift support member track means for movement upwardly and downwardly thereon; and said bale stack engaging means includes a pair of rearwardly extending squeeze arms mounted on said bale stack lift carriage and spaced apart laterally with respect to said chassis, said squeeze arms being relatively movable laterally and being actuatable to contact laterally into lifting engagement with a bottom tier of bales in a bale stack of the type formed by said bale stacking means.

14. A bale handling device as described in claim 1 in which:

said bale stacking means includes a tier container movably mounted on said chassis above said load bed for movement vertically with respect to said load bed, said tier container having sides disposed to form a tier of bales from bales delivered to said tier container and a bottom opening through which said tier of bales when formed, is passed upon upward movement of said tier container with respect to said load bed to form a bale stack on said load bed, and bale delivery means operatively associated with said chassis and said tier container and disposed to deliver bales to said tier container; and said power means includes tier container drive means drivingly interconnected with said tier container and disposed to elevate said tier container with respect to said load bed from a lower position juxtaposed said load bed to an upper position juxtaposed the top of said bale stack in steps, each approximately equal to the height of a tier of bales.

15. A bale handling device of the type described in claim 14 in which said bale delivery means includes:
a bale receiver operatively associated with said tier container and disposed to transfer bales to said tier container, a bale lift interconnected with said bale receiver and disposed to lift bales from the ground and deliver them to said bale receiver, and tie forming means disposed to form ties in selected tiers of bales as said bales are delivered to said tier container.

16. A bale handling device comprising:
a chassis having a horizontally disposed load bed thereon;
a tier container movably mounted on said chassis above said load bed for movement vertically with respect to said load bed, said tier container having sides disposed to form a tier of bales from bales delivered to said tier container and a bottom opening through which said tier of bales when formed, is passed upon upward movement of said tier container with respect to said load bed to form a bale stack on said load bed;

bale delivery means operatively associated with said chassis and said tier container and disposed to deliver bales to said tier container, said bale delivery means including a bale receiver operatively associated with said tier container and disposed to transfer bales to said tier container, a bale lift interconnected with said bale receiver and disposed to lift bales from the ground and transfer them to said bale receiver, and tie forming means disposed to form ties in selected tiers of bales as said bales are delivered to said tier container; and power means operatively associated with said chassis and said tier container and drivingly interconnected with said tier container and disposed to elevate said tier container with respect to said load bed from a lower position juxtaposed said load bed to an upper position juxtaposed the top of said bale stack in steps, each approximately equal to the height of a tier of bales.

17. A bale handling device as described in claim 16 in which:
said bale lift has two sections adjoined in longitudinal alignment and movable relative to each other to vary the overall length thereof, each of said sections have a bale engaging conveyor disposed to engage bales received at the ground and lift them to said bale receiver; and
said bale receiver has a bale engaging conveyor disposed to move bales longitudinally along said bale receiver support floor.

* * * * *